(12) United States Patent
Takemoto

(10) Patent No.: US 11,171,593 B2
(45) Date of Patent: Nov. 9, 2021

(54) IDENTIFICATION METHOD TO IDENTIFY TYPE OF BRUSHLESS DC MOTOR, IDENTIFIER, AND BRUSHLESS DC MOTOR

(71) Applicant: Nidec Corporation, Kyoto (JP)

(72) Inventor: Hideyuki Takemoto, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/767,612

(22) PCT Filed: Nov. 14, 2018

(86) PCT No.: PCT/JP2018/042154
§ 371 (c)(1),
(2) Date: May 28, 2020

(87) PCT Pub. No.: WO2019/107154
PCT Pub. Date: Jun. 6, 2019

(65) Prior Publication Data
US 2020/0295695 A1    Sep. 17, 2020

(30) Foreign Application Priority Data

Nov. 29, 2017 (JP) .............................. JP2017-229274

(51) Int. Cl.
*H02P 27/06* (2006.01)
*F04D 25/06* (2006.01)

(52) U.S. Cl.
CPC .............. *H02P 27/06* (2013.01); *F04D 25/06* (2013.01)

(58) Field of Classification Search
CPC .......... H02P 27/04; H02P 27/06; H02P 31/00; H02P 1/00; H02P 1/04; H02P 1/16; H02P 1/20; H02P 1/24; H02P 1/26; H02P 1/42; H02P 1/46; H02P 1/465; H02P 1/54; H02P 3/00; H02P 3/08; H02P 6/00; H02P 6/005; H02P 6/24; H02P 7/00; H02P 7/025;
(Continued)

(56) References Cited

U.S. PATENT DOCUMENTS 8,947,034 B2 * 2/2015 Chretien ................. H02P 31/00
                                                318/558
10,088,531 B2 * 10/2018 Kuroiwa ................ G01R 31/42
(Continued)

FOREIGN PATENT DOCUMENTS

JP         04-2472 A    1/1992
JP       2008-154425 A  7/2008
(Continued)

OTHER PUBLICATIONS

Official Communication issued in International Patent Application No. PCT/JP2018/042154, dated Feb. 12, 2019.

*Primary Examiner* — Antony M Paul
(74) *Attorney, Agent, or Firm* — Keating & Bennett

(57) ABSTRACT

A brushless DC motor identification method capable of identifying information on a brushless DC motor, particularly without performing any handshaking, includes supplying an input voltage from an identifier to a brushless DC motor including at least one resistor connected between a power supply line and a GND line, reading a resistance value of at least one resistor in a state where the inverter of the brushless DC motor is off, and identifying information on the brushless DC motor based on the read resistance value.

19 Claims, 20 Drawing Sheets

(58) Field of Classification Search
CPC .... H02P 7/06; H02P 7/288; H02P 8/00; H02P 8/24; H02P 21/00; H02P 21/0025; H02P 21/14; H02P 23/14; H02P 25/062; H02P 25/064; H02P 25/03; H02P 29/024; F04D 25/06
See application file for complete search history.

(56) References Cited

U.S. PATENT DOCUMENTS

2006/0152891 A1    7/2006   Jreij et al.
2014/0184129 A1    7/2014   Oka et al.

FOREIGN PATENT DOCUMENTS

| | | |
|---|---|---|
| JP | 2013-233198 A | 11/2013 |
| JP | 2014-128147 A | 7/2014 |
| JP | 2014-165969 A | 9/2014 |

* cited by examiner

| BRUSHLESS DC MOTOR TYPE | UNIQUE INFORMATION |
|---|---|
| 3'b001//SUPPLIER A | 20kΩ |
| 3'b010//SUPPLIER B | 30kΩ |
| 3'b011//SUPPLIER C | 40kΩ |

Fig. 6

| BRUSHLESS DC MOTOR TYPE | UNIQUE INFORMATION |
|---|---|
| 3'b001//SUPPLIER A | 8'h41 "A" |
| 3'b010//SUPPLIER B | 8'h42 "B" |
| 3'b011//SUPPLIER C | 8'h43 "C" |

Fig. 10

IDENTIFICATION METHOD TO IDENTIFY TYPE OF BRUSHLESS DC MOTOR, IDENTIFIER, AND BRUSHLESS DC MOTOR

CROSS REFERENCE TO RELATED APPLICATIONS

This is a U.S. national stage of PCT Application No. PCT/JP2018/042154, filed on Nov. 14, 2018, and priority under 35 U.S.C. § 119(a) and 35 U.S.C. § 365(b) is claimed from Japanese Application No. 2017-229274, filed Nov. 29, 2017; the entire disclosures of which are hereby incorporated herein by reference.

FIELD OF THE INVENTION

The present disclosure relates to an identification method to identify the type of a brushless DC motor, an identifier, and a brushless DC motor.

BACKGROUND

Many electronic devices include, for example, a fan motor as a cooling device for releasing heat generated inside to the outside. In an electronic device, a fan motor is electrically connected to a system controller and operates under the control of the system controller.

In a conventional identification method, a fan motor and a system controller communicate with each other to obtain fan identification information. For example, the mode is switched from a normal mode to a command mode, and the fan motor and the system controller transmit and receive commands via a power supply line, a pulse width modulation (PWM) line, and a tachometer (TACH) line. The system controller obtains the fan identification information by handshaking and determines compatibility with the fan motor. In this case, both the system controller and the fan require complicated control software such as switching between the normal mode and the command mode.

A conventional motor drive has a regenerative resistor and an operation switch, and has a regenerative power consumption unit connected between DC buses. The operation switch is controlled by comparing the drive voltage and the regenerative voltage. By turning on the operation switch, it is possible to consume the regenerative power from the motor by the regenerative resistor.

In the above-described conventional art, a method for more easily identifying information on a brushless DC motor has been desired.

SUMMARY

An example embodiment of the present disclosure provides an identification method to identify with an identifier information on a brushless DC motor output from the brushless DC motor. The brushless DC motor includes at least one resistor connected between a power supply line and a GND line. The method includes supplying an input voltage from the identifier to the brushless DC motor via the power supply line, reading a resistance value of the at least one resistor in a state where an inverter of the brushless DC motor is off, and identifying information on the brushless DC motor based on the read resistance value of the at least one resistor.

An identifier according to an example embodiment of the present disclosure identifies information on a brushless DC motor including an inverter that drives a motor, and at least one resistor connected between a power supply line and a GND line. The identifier includes a power supply terminal to supply an input voltage to the brushless DC motor via the power supply line, and a controller that identifies information on the brushless DC motor. The controller supplies the input voltage to the brushless DC motor, and reads a resistance value of the at least one resistor in a state where the inverter of the brushless DC motor is off, and identifies the information on the brushless DC motor based on the read resistance value of the at least one resistor.

A brushless DC motor according to an example embodiment of the present disclosure includes a circuit board, a power supply terminal to supply an input voltage from outside, the power supply terminal being on the circuit board, an inverter that drives the motor, and at least one resistor connected between a power supply line connected to the power supply terminal and a GND line, the at least one resistor having a resistance value larger than a DC resistance of the motor. In a state where the input voltage is supplied via the power supply terminal and the inverter is off, a current including information indicating the resistance value of the at least one resistor flows through the power supply terminal.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 6 is a diagram illustrating a table used to identify the type of the brushless DC motor 200.

FIG. 10 is a diagram illustrating a table used to identify the type of a brushless DC motor, using an ASCII code as unique information.

DETAILED DESCRIPTION

Hereinafter, example embodiments of identification methods and identifiers to identify the type of a brushless DC motor according to the present disclosure will be described in detail with reference to the accompanying drawings. However, in order to avoid the following description from being unnecessarily redundant and to make it easier for those skilled in the art to understand, a detailed description more than necessary may be omitted. For example, a detailed description of a well-known item or a redundant description of substantially the same configuration may be omitted. In addition, example embodiments of the present disclosure are not limited to the devices or methods illustrated below. For example, one example embodiment can be combined with another example embodiment.

Figure 1:
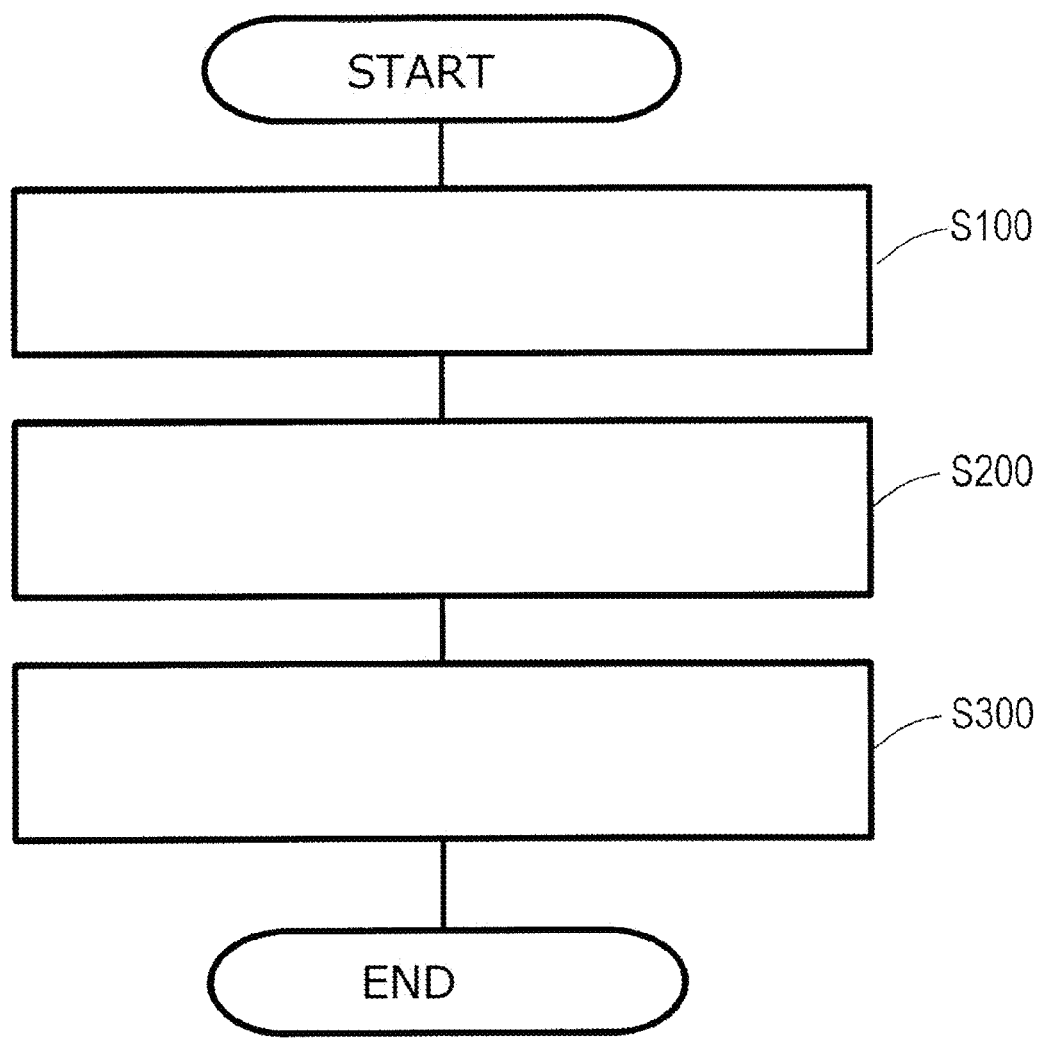
FIG. 1 is a flowchart of an identification method to identify the type of a brushless DC motor according to an example embodiment the present disclosure.

Before describing an example embodiment of the present disclosure, overview of an identification method according to the present disclosure will be described with reference to FIG. 1. FIG. 1 shows a flowchart of an identification method to identify the type of a brushless DC motor according to the present disclosure.

The identification method according to the present disclosure is an identification method used for an identifier that identifies information on a brushless DC motor output from the brushless DC motor. The brushless DC motor is typically a two-wire motor having a power supply terminal and a GND terminal, and includes at least one resistor connected between the power line and the GND line. When a power supply voltage is supplied to the brushless DC motor via the power supply terminal, in a state where the inverter is stopped (off), an identification current including identification information indicating a resistance value of at least one resistor flows through the power supply terminal. In this specification, at least one resistor may be referred to as an "identification resistor", and a resistance value thereof may be referred to as an "identification resistance value".

An identification method according to the present disclosure includes a step of supplying a power supply voltage from an identifier to a brushless DC motor via a power supply line (step S100), a step of reading a resistance value of at least one resistor in a state where the inverter of the brushless DC motor is stopped (step S200), and a step of identifying information on the brushless DC motor based on the read resistance value of at least one resistor (step S300).

According to the identification method according to the present disclosure, it is possible to identify various types of information on a brushless DC motor output from the brushless DC motor. Such information includes, for example, brushless DC motor identification information, brushless DC motor serial number, lot number, input power, input current, input voltage, motor temperature, rated current or rated voltage, and the like. In the present specification, example embodiments to identify the type of a brushless DC motor, among various types of information related to the brushless DC motor, will be mainly described.

Figure 2:
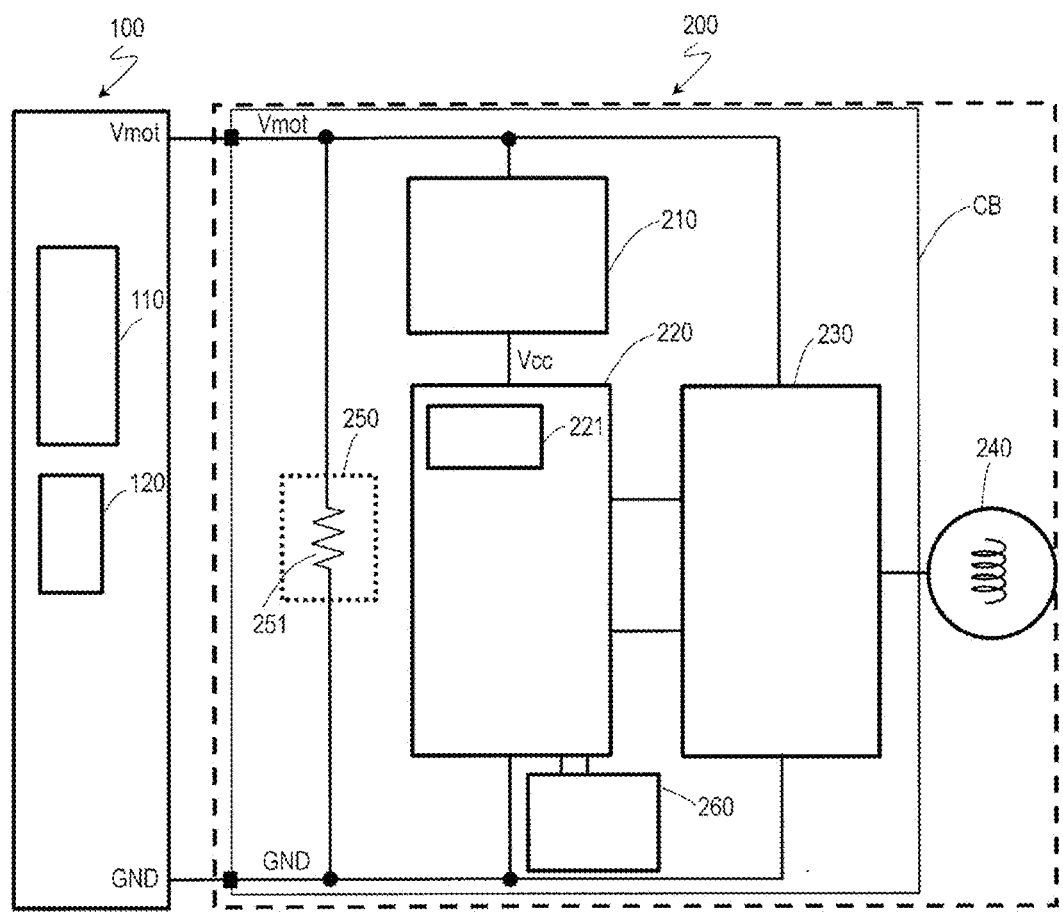
FIG. 2 is a block diagram schematically showing examples of typical block configurations of a user system 100 and a brushless DC motor 200 according to a first example embodiment of the present disclosure.

FIG. 2 schematically shows examples of typical block configurations of the user system 100 and the brushless DC motor 200 according to the present example embodiment. In this specification, the structure and the operation of the brushless DC motor 200 will be described using a fan motor as an example. The brushless DC motor of the present disclosure includes an inner rotor type or outer rotor type motor. The brushless DC motor 200 is not limited to a fan motor, and is a brushless DC motor used for various applications. The brushless DC motor 200 is, for example, a motor used for home appliances such as an air conditioner or a washing machine, and a vehicle-mounted motor.

The user system 100 is electrically connected to the brushless DC motor 200. The user system 100 can supply power to the brushless DC motor 200. The user system 100 can be mounted on a brushless DC motor production management system in a factory that produces a wide variety of products. The user system 100 is a system in an electronic device or a vehicle-mounted system on which the brushless DC motor 200 can be mounted. For example, the brushless DC motor 200 is preferably mounted on an electronic device such as a server, a main body of a desktop personal computer, or a game machine. For example, when brushless DC motors 200 with different specifications are produced at the same location, the user system 100 is part of a series of inspection systems. Alternatively, when the brushless DC motor 200 is mounted as a fan motor on the main body of a server or a desktop personal computer, the user system 100 is the entire system or part of the system including various electronic components mounted on a motherboard.

The user system 100 includes, for example, a controller 110 and a memory 120. The user system 100 according to the present example embodiment has a function of identifying the type of the brushless DC motor 200, as described later. In other words, the user system 100 can be used as an identifier to identify the type of the brushless DC motor 200. Therefore, in this specification, the user system 100 may be referred to as an identifier 100 in some cases.

The controller 110 mainly controls the entire user system 100 and can control power supply to the brushless DC motor 200. The controller 110 can further identify the type of the brushless DC motor 200. The controller 110 is, for example, a semiconductor integrated circuit such as a micro control unit (MCU) or a field programmable gate array (FPGA).

The memory 120 is, for example, a writable memory (for example, PROM), a rewritable memory (for example, flash memory), or a read-only memory. The memory 120 stores, for example, a control program having a command group for causing the controller 110 to identify the type of the brushless DC motor 200. For example, the control program is temporarily expanded in a RAM (not shown) at the time of booting. The memory 120 does not need to be externally attached to the controller 110, and may be mounted on the controller 110. The controller 110 including the memory 120 is, for example, the above-described MCU.

The user system 100 includes a Vmot terminal and a GND terminal as connection terminals with the brushless DC motor 200. The Vmot terminal is a terminal for a motor power supply. For example, a motor power supply voltage Vmot in a range from 7.0 to 13.8 V is supplied to the brushless DC motor 200 from the Vmot terminal.

Figure 3:
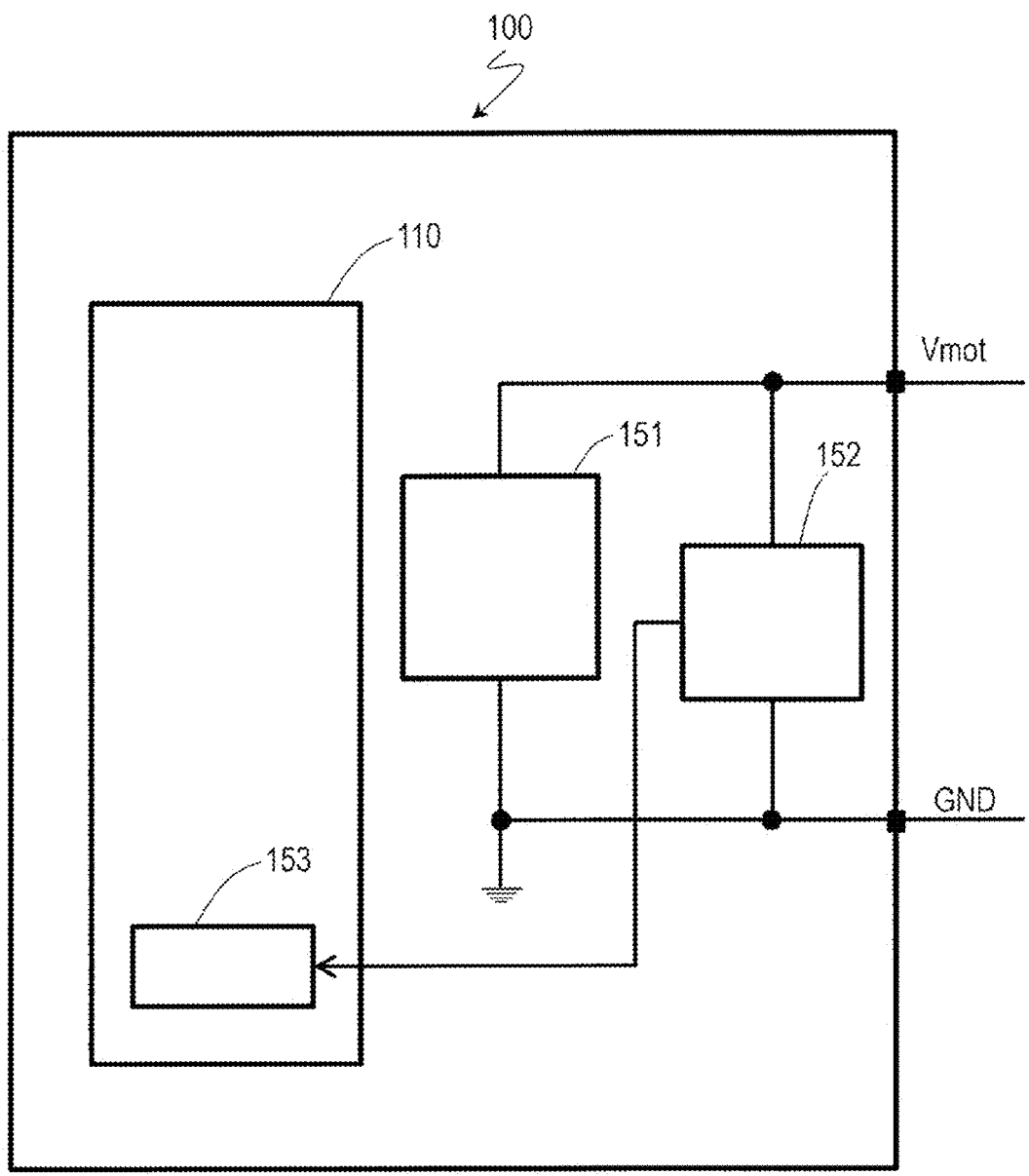
FIG. 3 is a block diagram schematically showing an example of a block configuration inside the user system 100.

FIG. 3 schematically shows an example of a more detailed block configuration inside the user system 100.

The user system 100 further includes, for example, a DC power supply 151, a resistance value detector 152, and a discriminator 153. When referring to the internal block configuration of the user system 100 or the identifier 100, the components of the controller 110, the DC power supply 151, the resistance value detector 152, and the discriminator 153 may be collectively referred to simply as "controller 110".

The DC power supply 151 mainly generates a motor power supply voltage Vmot (for example, 7.0 to 13.8 V) to be supplied to the brushless DC motor 200 during normal motor driving. The normal motor driving means driving the motor in a state where the inverter 230 of the brushless DC motor 200 is operated by supplying power to the inverter 230.

The resistance value detector 152 can generate a power supply voltage to be supplied to the brushless DC motor 200 and supply the power supply voltage to the brushless DC motor 200, in identifying the type of the brushless DC motor 200. The power supply voltage may be lower than the motor power supply voltage Vmot generated by the DC power supply 151. Furthermore, the resistance value detector 152 can detect the identification resistance value of the brushless DC motor 200 based on the identification current flowing through the power supply line and the power supply voltage, in identifying the type of the brushless DC motor 200.

The discriminator 153 identifies the type of the brushless DC motor 200 based on the identification resistance value of the brushless DC motor detected by the resistance value detector 152. The discriminator 153 is typically mounted on the controller 110.

FIG. 2 is referred to again.

The brushless DC motor 200 is, for example, a DC fan having an impeller. The brushless DC motor 200 is, for example, an axial fan, a centrifugal fan, a cross flow fan, or a sirocco fan. The brushless DC motor 200 typically includes a regulator 210, a motor drive IC 220, an inverter 230, a circuit board CB on which those electronic components are mounted, a coil 240, an identification resistance unit 250 having at least one resistor 251, and a Hall element 260. For example, the regulator 210, the motor drive IC 220, the inverter 230, and the Hall element 260 constitute a drive circuit for energizing the coil 240 to drive the motor.

The regulator 210 reduces the motor power supply voltage Vmot of, for example, 13.8 V to generate a power supply voltage Vcc (for example, 5 V) for the motor drive IC 220. In the brushless DC motor 200, the power supply voltage Vcc supplied to the motor drive IC 220 is preferably generated based on the motor power supply voltage Vmot. As a result, it is not necessary to provide a terminal for the power supply voltage Vcc in the brushless DC motor 200, and the number of terminals and lead wires can be reduced. However, the power supply voltage Vcc may be supplied from the user system 100 to the brushless DC motor 200 separately from the motor power supply voltage Vmot.

The motor drive IC 220 includes, for example, an MCU 221 and is connected to the inverter 230. The MCU 221 generates a PWM signal for controlling rotation of the motor. The motor drive IC 220 generates a control signal for controlling the inverter 230 according to the PWM signal and outputs the control signal to inverter 230.

The MCU 221 incorporates a general timer function. By using this function, the MCU 221 can stop generating the PWM signal until a predetermined time elapses from the start of application of the power supply voltage Vcc. The predetermined time is, for example, about 0.1 s. Thus, driving of the inverter 230 can be stopped from the start of application of the power supply voltage Vcc until the predetermined time elapses.

The motor drive IC 220 monitors the rotation speed of the motor based on, for example, the output from the Hall element 260, and generates a PWM signal according to the rotation speed of the motor. The output method is, for example, two pulses per rotation. However, a technique that does not use a Hall element is known. When such a technique is employed, the Hall element 260 is not essential.

The inverter 230 is electrically connected to motor drive IC 220 and coil 240 of the motor. The inverter 230 converts the power of the motor power supply to the power to be supplied to the fan motor under the control of the motor drive IC 220, and energizes the coil 240 of the motor.

The coil 240 is a winding of the motor.

The identification resistance unit 250 has at least one resistor 251. For example, the identification resistor 251 has a resistance value that is ten times or more the DC resistance of the motor. With a large resistance value, it is possible to suppress the power loss due to the identification resistor 251 during normal motor driving. As the identification resistor 251, for example, a resistor having a resistance value in a range from 1 kΩ to 100 kΩ can be used.

The resistance value of the identification resistor 251 differs for each type of a plurality of brushless DC motors. As the unique information of the brushless DC motor, a different unique resistance can be assigned to the identification resistor 251 for each type of the brushless DC motors.

For example, an identification resistor can be assigned as unique information of a brushless DC motor for each supplier that manufactures brushless DC motors. For example, a 20 kΩ identification resistor can be assigned to a supplier A, a 30 kΩ identification resistor can be assigned to a supplier B, and a 40 kΩ identification resistor can be assigned to a supplier C. Further, identification resistors having resistance values different from these can be assigned to a plurality of suppliers, respectively.

For example, an identification resistor can be assigned as unique information for each product lot. For example, a 20 kΩ identification resistor can be assigned to a product lot number A, a 30 kΩ identification resistor can be assigned to a product lot number B, and a 40 kΩ identification resistor can be assigned to a product lot number C. Further, a different identification resistance value can be assigned to each of a plurality of product lot numbers. Thus, there are as many types of the plurality of brushless DC motors as, for example, the number of suppliers or as the number of product lots to be managed.

The brushless DC motor 200 includes, for example, a circuit board CB on which a Vmot terminal and a GND terminal are disposed corresponding to the terminals on the user system 100 side.

Figure 4:
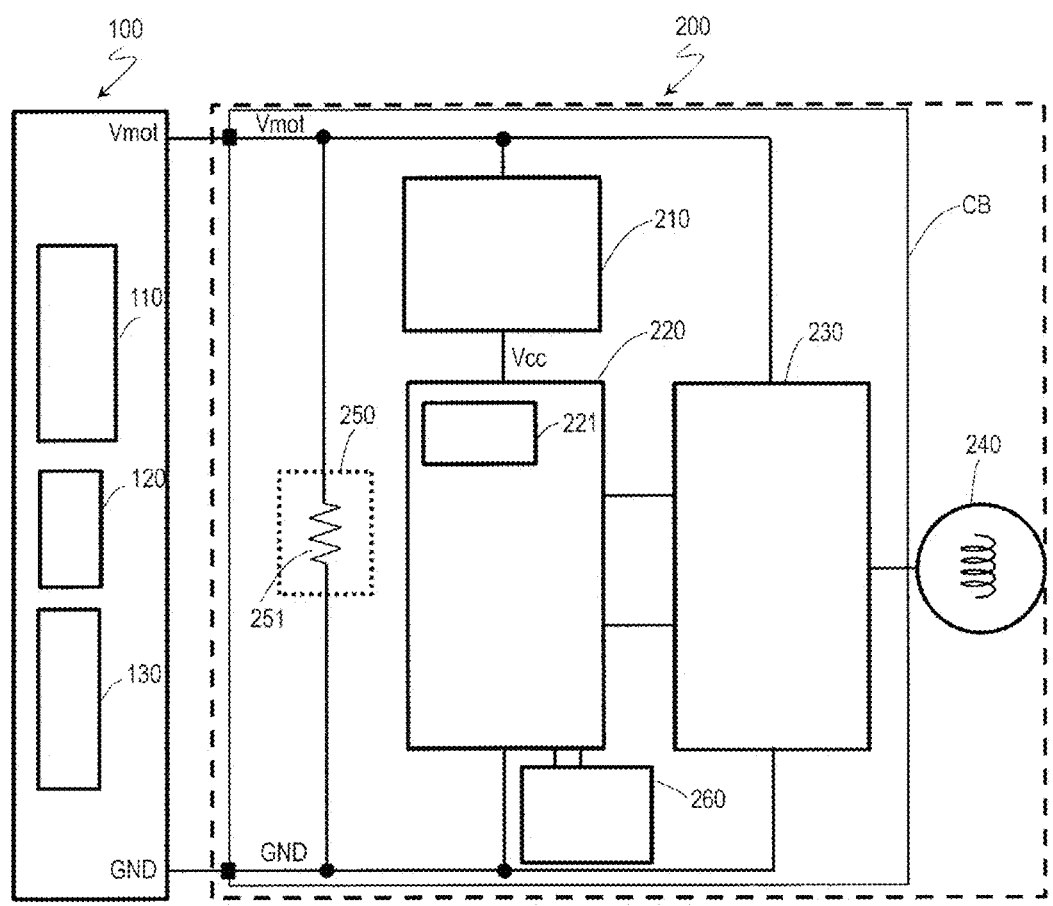
FIG. 4 is a block diagram schematically showing another example of a block configuration of the user system 100 and the brushless DC motor 200 according to the first example embodiment of the present disclosure.

FIG. 4 schematically shows other exemplary block configurations of the user system 100 and the brushless DC motor 200.

The user system 100 may further include a light emitting element 130. The light emitting element 130 has, for example, a plurality of light emitted diodes (LEDs). The plurality of LEDs are notification devices that notify the identification result of the type of the brushless DC motor 200. For example, a plurality of LEDs can be provided by the number of types of a plurality of brushless DC motors. For example, if there are two types of brushless DC motors of suppliers A and B, two LEDs with different emission colors can be provided. For example, a red LED for supplier A and a blue LED for supplier B can be used.

Figure 5:
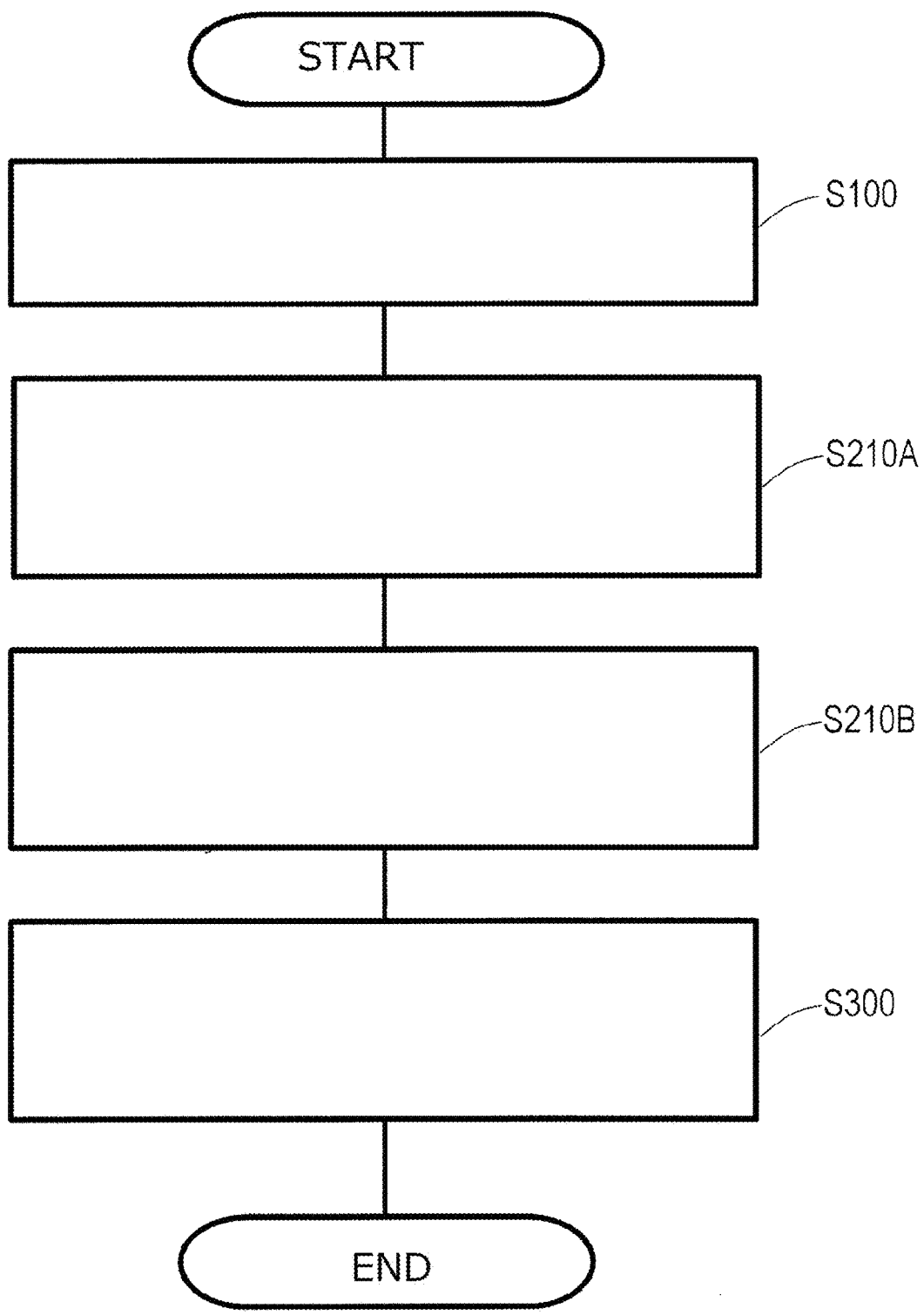
FIG. 5 is a flowchart of an identification method to identify the type of the brushless DC motor 200 according to the first example embodiment of the present disclosure.

FIG. 5 shows a flowchart of an identification method to identify the type of the brushless DC motor 200 according to the present example embodiment.

The identification method according to the present example embodiment is a method used for the identifier 100, for example. In the process of manufacturing a wide variety of products having motors, it is generally necessary to identify the type of the brushless DC motor 200 in order to prevent mixing of different types of motors. For example, the identification method of the present disclosure is suitably used for a method of inspecting compatibility of the brushless DC motor 200 with the user system 100 when manufacturing a product in a factory. For example, a step of checking compatibility of the brushless DC motor 200 can be incorporated as part of the product manufacturing process.

First, in a state where the terminals of the identifier 100 (user system 100) and the brushless DC motor 200 are electrically connected, an identification power supply voltage is supplied from the identifier 100 to the brushless DC motor 200. For example, a power supply voltage of 13.8 V generated by the resistance value detector 152 is supplied to the brushless DC motor 200 as an identification power supply voltage. However, the motor power supply voltage Vmot may be supplied as the identification power supply voltage from the DC power supply 151 to the brushless DC motor 200 in the same manner as that during normal driving.

Generation of a PWM signal is stopped using the timer function of the MCU 221 of the motor drive IC 220 from the start of application of the identification power supply voltage until a predetermined time (for example, 0.1 s) elapses. Thereby, driving of the inverter 230 is stopped. In this state, even if the identification power supply voltage is supplied to the inverter 230, a PWM signal is not input, so that driving of the inverter 230 remains stopped. As a result, power is not supplied from the inverter 230 to the coil 240 of the motor.

With use of the identifier 100, an identification resistance value is read as unique information of the brushless DC motor 200 in state where the inverter 230 is stopped. More specifically, an identification resistance value is read as unique information of the brushless DC motor 200 with use of the resistance value detector 152 of the identifier 100 in a state where the inverter 230 is stopped. When an identification power supply voltage is applied to the brushless DC motor 200, a current flowing through the identification resistor 251 according to the identification resistance value flows through the resistance value detector 152. This is because the motor current does not flow through the motor. That is, only the identification current including the information on the identification resistance value flows to the resistance value detector 152. By measuring the identification current, the resistance value detector 152 can detect the identification resistance value from the current value and the identification power supply voltage. On the other hand, when the inverter 230 is driven, the motor current flows and the current fluctuation increases, so that it is difficult to detect the identification resistance value.

The discriminator 153 refers to a table and identifies the type of the motor based on the detected identification resistance value.

FIG. 6 illustrates a table used to identify the type of the brushless DC motor 200. The table is a look-up table (LUT) for associating a plurality of brushless DC motor types with pieces of unique information of the plurality of brushless DC motors. The unique information of the brushless DC motor indicates the identification resistance value. The table is stored in the memory 120, for example. As described above, a plurality of types of brushless DC motors exist, for example, for respective suppliers, and for example, there are three types of suppliers A, B, and C. For example, the type of motor can be represented by, for example, a 3-bit digital signal.

For example, the discriminator 153 may include an AD converter (not shown). The discriminator 153 converts the identification resistance value (analog value) detected by the resistance value detector 152 into a digital signal. The unique information of the brushless DC motor can also be represented by a digital value having the same bit width as the resolution of AD conversion. Note that the AD converter may be mounted on the resistance value detector 152 in the preceding stage.

When the identification of the type of the brushless DC motor by the identifier 100 is completed, the stopped state of the inverter 230 is released. Thereafter, for example, the motor power supply voltage Vmot is supplied from the DC power supply 151 to the brushless DC motor 200. When a PWM signal is provided from the motor drive IC 220 to the inverter 230, the inverter 230 starts driving of the motor in a normal state.

According to the identification method of the present example embodiment, it is possible to identify the type of the brushless DC motor 200 in a state where the inverter 230 is stopped. Identification of the type of the brushless DC motor 200 can be performed separately from the normal driving of the motor, so that the load on the identifier 100 can be reduced. Furthermore, communication by handshaking between the identifier 100 and the brushless DC motor 200 as in the related art is unnecessary. In addition, an existing power supply terminal can be used, and it is not necessary to newly provide a dedicated terminal for identification. Product cost can be reduced by reducing the number of parts. Since input and output terminals such as a PWM terminal and a TACH terminal are not particularly required for identification, an advantage is obtained particularly to identify the type of a two-wire motor.

The identification method of the present disclosure is preferably used not only at the time of product manufacturing but also, for example, when replacing a failed brushless DC motor with a new brushless DC motor. It is possible to check whether or not the replaced brushless DC motor is compatible with the system. Also, for example, each product provided to a brushless DC motor is connected to the Internet. The so-called Internet of Things (IoT) is realized. For example, a supplier of an individual product equipped with a brushless DC motor can identify a product equipped with a specific brushless DC motor by analyzing big data including the unique information of the brushless DC motor. This can stabilize the quality, for example, by preventing occurrence of defects.

Figure 7:
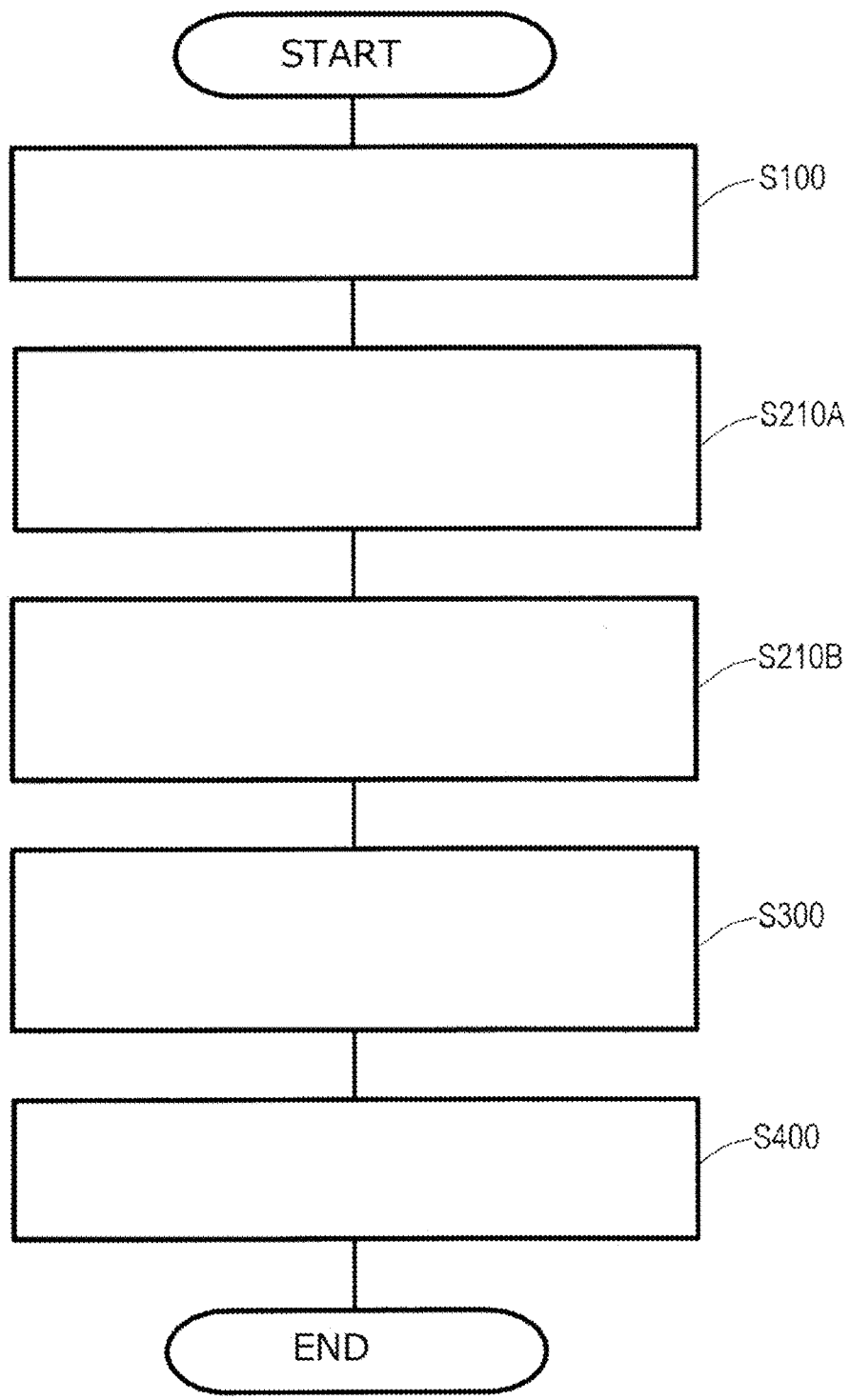
FIG. 7 is a flowchart of a further identification method to identify the type of the brushless DC motor 200 according to the first example embodiment of the present disclosure.

FIG. 7 shows a further specific example of a flowchart of the identification method to identify the type of the brushless DC motor 200.

As shown in FIG. 7, the identification method according to the present example embodiment can further include a step S400 of notifying a result of identifying the type of the brushless DC motor 200.

As an example of the notifying method, it is possible to notify a result of identifying the type of the brushless DC motor 200 using the light emitting element 130 (for example, a plurality of LEDs) shown in FIG. 4. The controller 110 of the identifier 100 causes the LED assigned to the identification target brushless DC motor 200, among a plurality of LEDs assigned to the respective types of brushless DC motors, to emit light based on the result of identifying the type of the brushless DC motor 200. Note that the light emitting element is not limited to an LED, and may be an element that gives notice by light.

For example, a red LED can be assigned to a supplier A, a blue LED can be assigned to a supplier B, and a green LED can be assigned to a supplier C. When the controller 110 of the identifier 100 identifies a brushless DC motor of the supplier C, the controller 110 can cause a green LED to emit light. Thus, for example, a factory worker can visually recognize whether or not the brushless DC motor to be identified is a motor of the supplier C.

As another example, a result of identifying the type of the brushless DC motor 200 can be notified using a display device (for example, a liquid crystal display) or a speaker. For example, the identification result can be displayed on a liquid crystal display as character information. For example, it is possible to change the pitch of the sound for each type of a plurality of brushless DC motors and make the speaker sound.

As another example, the controller 110 of the identifier 100 may temporarily write the identification result to the memory 120 or transmit it to another apparatus or device that needs the identification result. These modes are also examples of notifying the identification result.

In addition to the type information of the brushless DC motor, various types of information on the brushless DC motor such as the serial number, lot number, input power, input current, input voltage, motor temperature, rated current or rated voltage of the brushless DC motor can be associated with the identification resistance value. With the identification resistor associated with such information being provided on the brushless DC motor side, the identifier 100 can acquire various types of information regarding the brushless DC motor.

Figure 8:
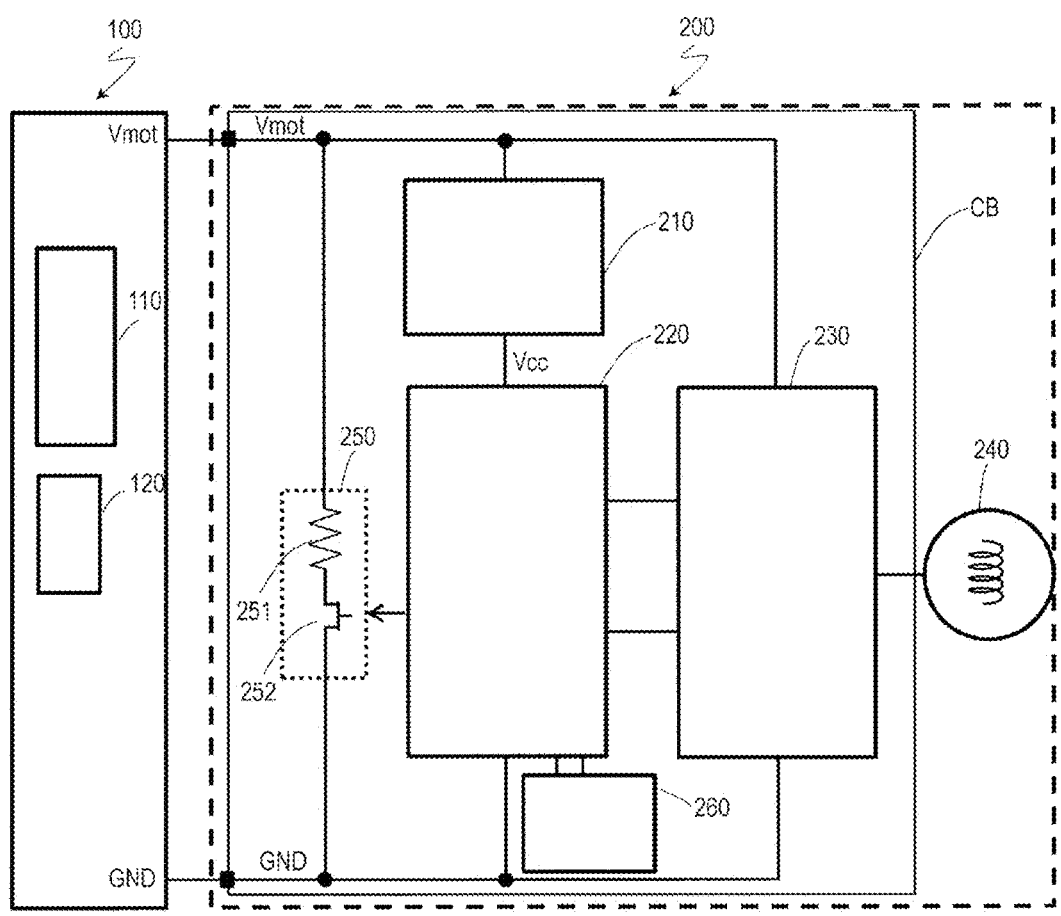
FIG. 8 is a block diagram schematically showing a variation of a block configuration of the user system 100 and the brushless DC motor 200 according to the first example embodiment of the present disclosure.

FIG. 8 schematically shows variations of the block configurations of the user system 100 and the brushless DC motor 200 according to the present example embodiment.

In the configuration of the variation, the identification resistance unit 250 includes an identification resistor 251 and a switch 252 connected between one end of the identification resistor 251 and the GND line. However, the switch 252 may be connected between the other end of the identification resistor 251 and the power supply line. As the switch 252, for example, a semiconductor switch of a bipolar or unipolar transistor can be used.

For example, the motor drive IC 220 can control on/off of the switch 252 at predetermined time intervals. The predetermined time interval is, for example, 1 ms.

Figure 9:
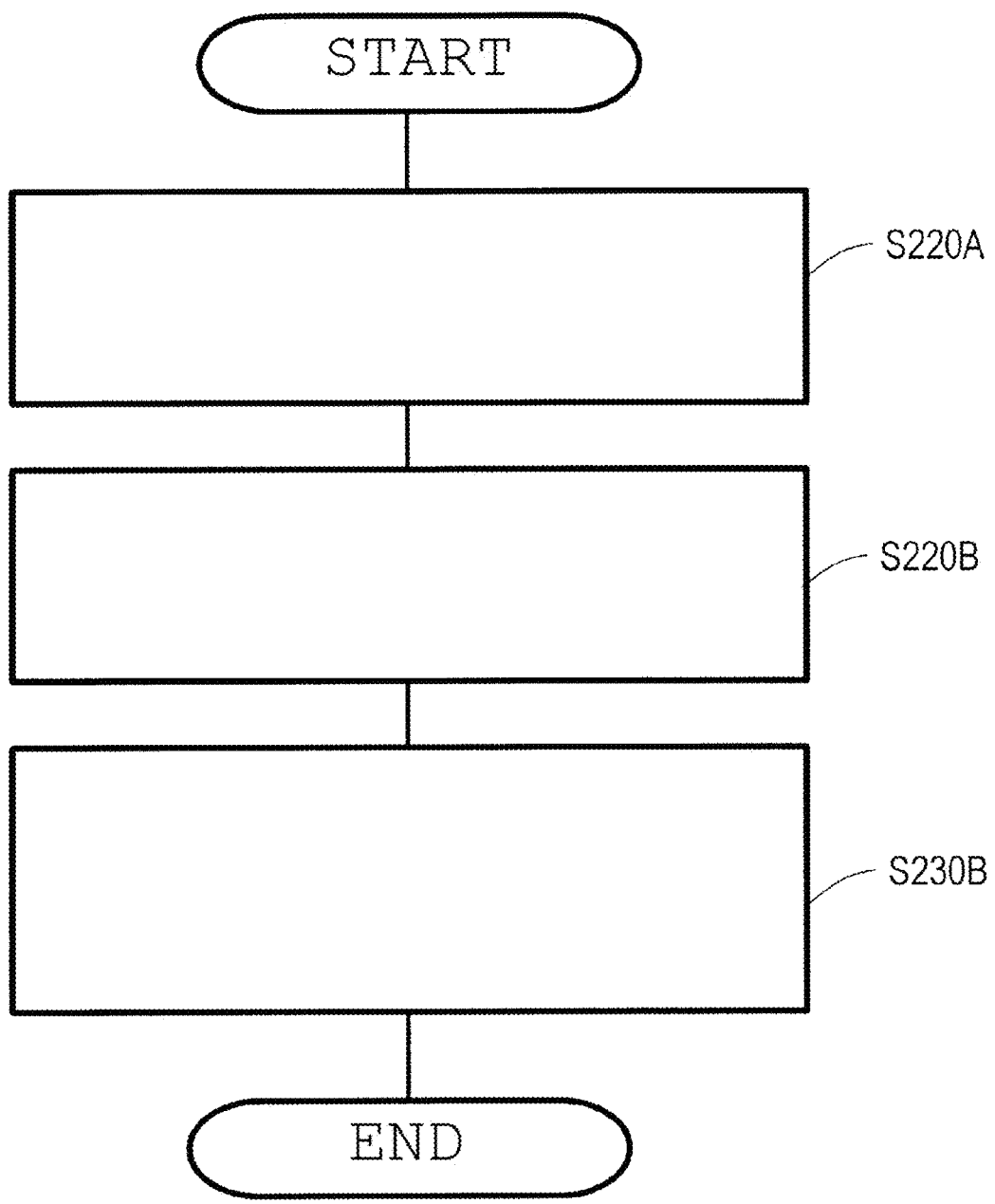
FIG. 9 is a flowchart showing a specific example of a process of step S200 of reading an identification resistance value.

FIG. 9 shows a more detailed flowchart of step S200 for reading the identification resistance value in the processing flow of the identification method to identify the type of the brushless DC motor 200 according to the present variation.

As in step S210A, generation of a PWM signal is stopped using the timer function of the MCU 221 of the motor drive IC 220 from the start of application of the identification power supply voltage until a predetermined time (for example, 0.1 s) elapses.

In a state where driving of the inverter 230 is stopped, the switch 252 is turned on/off by the motor drive IC 220. For example, the motor drive IC 220 turns on/off the switch 252 every 1 ms. When the switch 252 is turned on, the resistance value of the identification resistor 251 is set as an identification resistance value, and when the switch 252 is turned off, a high impedance value is set as an identification resistance value. The resistance value of the identification resistor 251 is, for example, 20 kΩ.

In one example embodiment, for example, a state in which 20 kΩ is set as the identification resistance value can be assigned to the communication state H indicating the high-level digital information "1", and a state in which the high impedance value is set as the identification resistance value can be assigned to a communication state L indicating the low-level digital information "0". For example, by turning on/off the switch 252 every 1 ms by the motor drive IC 220, character string information configured of various code words such as an ASCII code or a binary code can be transmitted to the identifier 100.

For example, by turning on/off the switch 252 in the order of "off, on, off, on, on, off, on, off", the character string information of the ASCII code "01011010" for uppercase "Z" can be transmitted. The character string information includes information on a plurality of resistance values including 20 kΩ and a high impedance value. More specifically, the character string information is configured of digital information corresponding to an identification resistance value of 20 kΩ and digital information "0" corresponding to a high impedance value. The character string information is transmitted at a predetermined bit rate. The predetermined time interval can be determined based on the predetermined bit rate.

The character string information output from the brushless DC motor 200 is sequentially acquired using the resistance value detector 152 of the identifier 100. When the resistance value detector 152 receives the character string information of the ASCII code "01011010" for the capital letter "Z", the identification resistance value is detected in the order of "high impedance value, 20 kΩ, high impedance value, 20 kΩ, 20 kΩ, high impedance value, 20 kΩ, high impedance value".

For example, the ASCII code "01000001" for uppercase "A" can be assigned to the supplier A, the ASCII code "01000010" for uppercase "B" can be assigned to the supplier B, and the ASCII code "01000011" for uppercase "C" can be assigned to the supplier C. The resistance value detector 152 identifies the type of the motor by referring to the table based on the acquired character string information, that is, a plurality of resistance value groups.

FIG. 10 illustrates a table used to identify the type of the brushless DC motor using an ASCII code as unique information. This table associates a plurality of brushless DC motor types with a plurality of ASCII codes. In this example, the ASCII code is the unique information of the brushless DC motor.

For example, after power is supplied to the brushless DC motor of the supplier A, the ASCII code "01000001" is output from the brushless DC motor. The identifier 100 can acquire the ASCII code "01000001" information and refer to the look-up table to specify that the motor to be identified is the brushless DC motor of the supplier A.

The identification resistance unit 250 of the brushless DC motor 200 has various other variations.

The identification resistor 251 can include a plurality of resistors connected in series or in parallel to each other. The identification resistance unit 250 can further include at least one switch connected to the plurality of resistors. A resistance value group including at least one of a resistance value of each of the plurality of resistors and a combined resistance value that can be set by each of the resistance values is obtained, and information on the brushless DC motor 200 is detected based on the resistance value group by the resistance value detector 152. In other words, the resistance value detector 152 identifies information on the brushless DC motor 200 based on a change in the resistance value due to turning on/off of the switch.

Figure 11A:
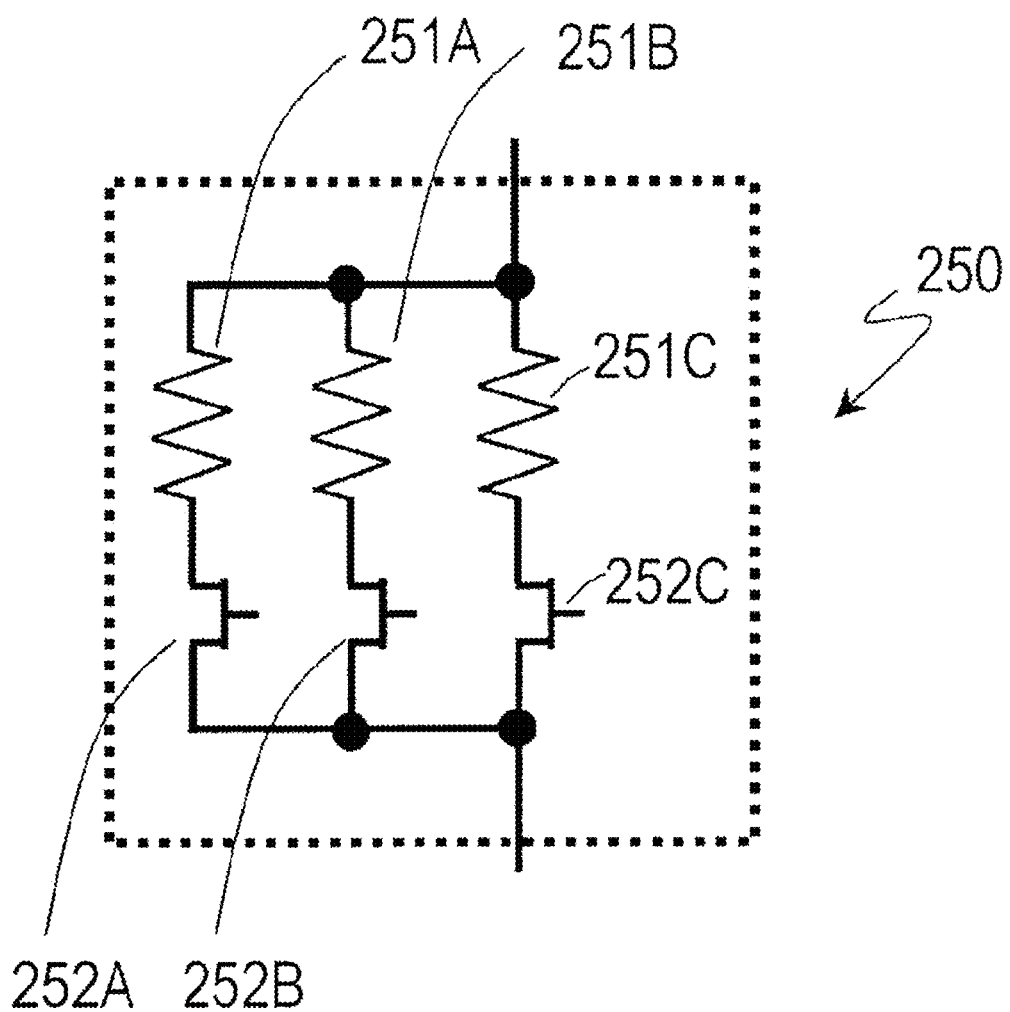
FIG. 11A is a circuit diagram showing a circuit configuration of a variation of an identification resistance unit 250.
Figure 11B:
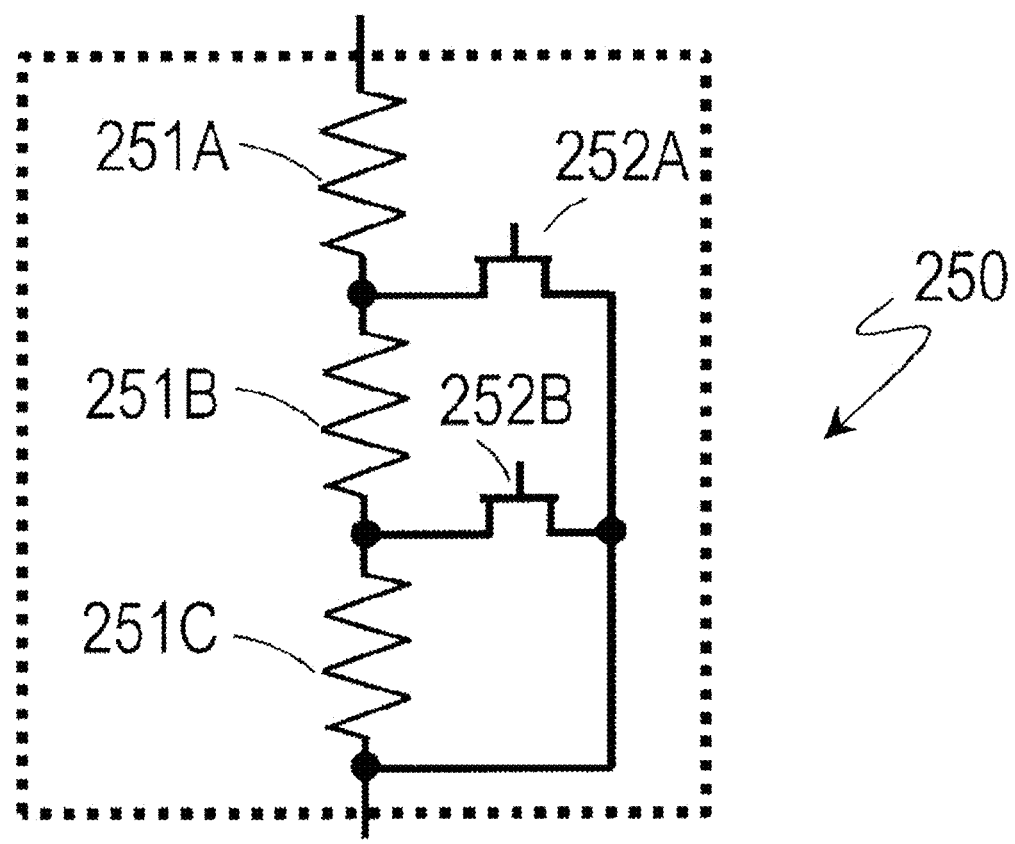
FIG. 11B is a circuit diagram showing a circuit configuration of a variation of the identification resistance unit 250.
Figure 11C:
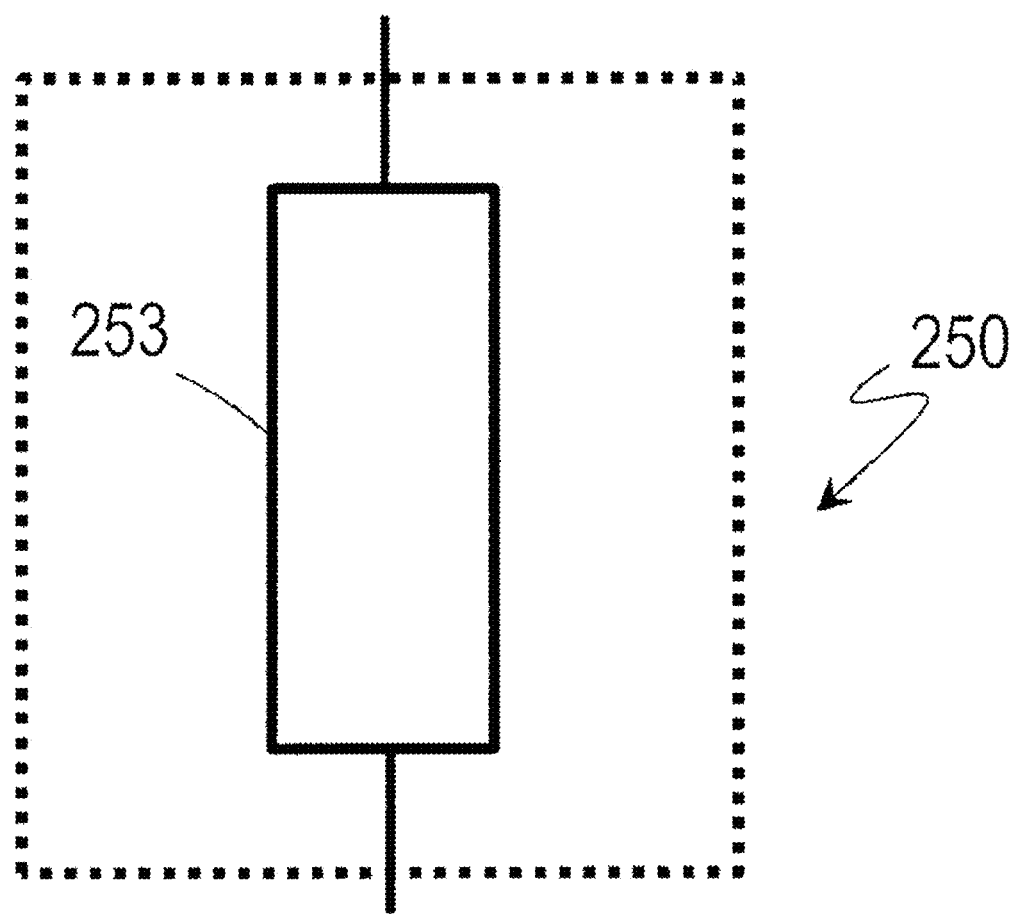
FIG. 11C is a circuit diagram showing a circuit configuration of a variation of the identification resistance unit 250.
Figure 12A:
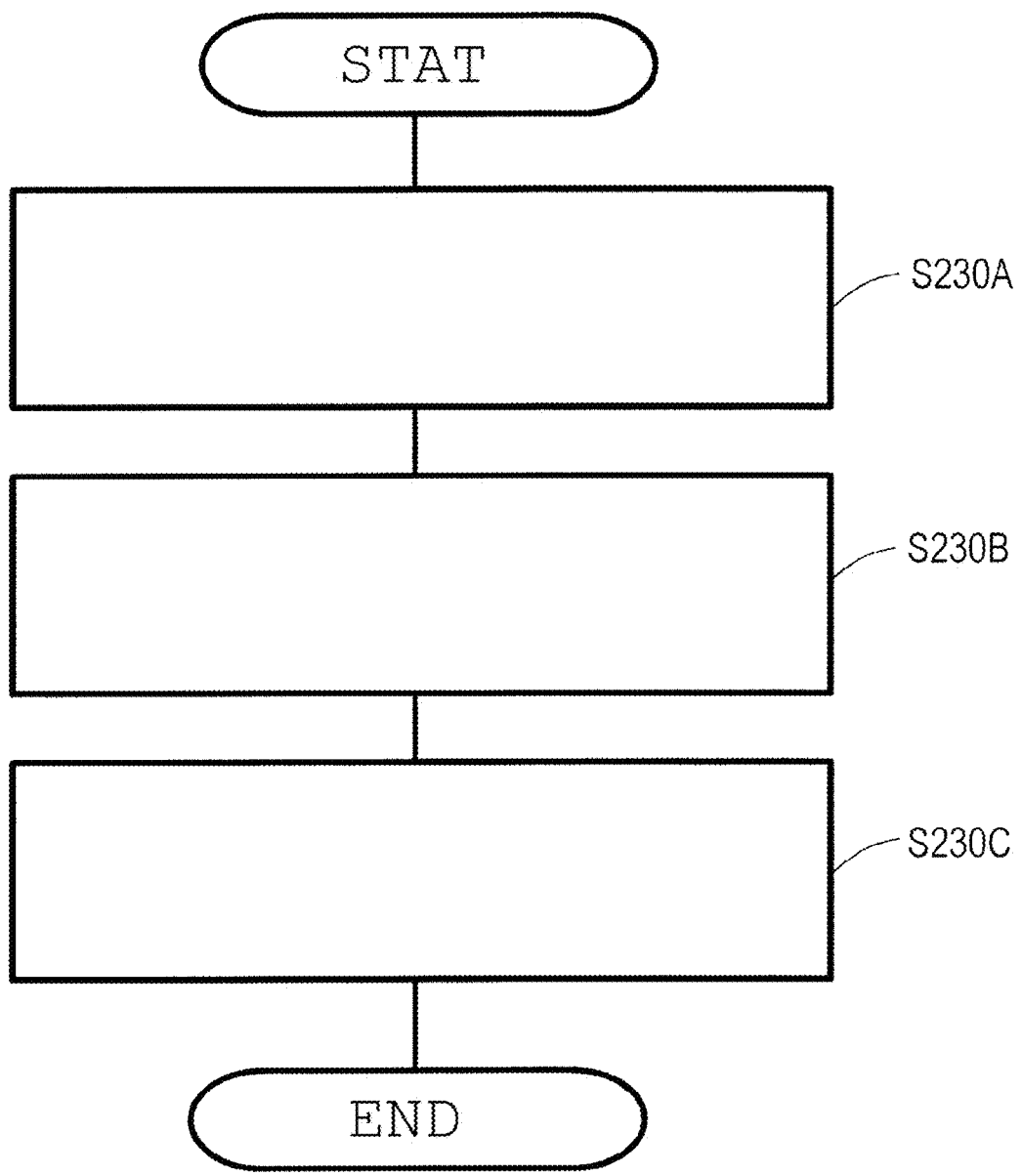
FIG. 12A is a flowchart showing another specific example of the process of step S200 for reading the identification resistance value.
Figure 12B:
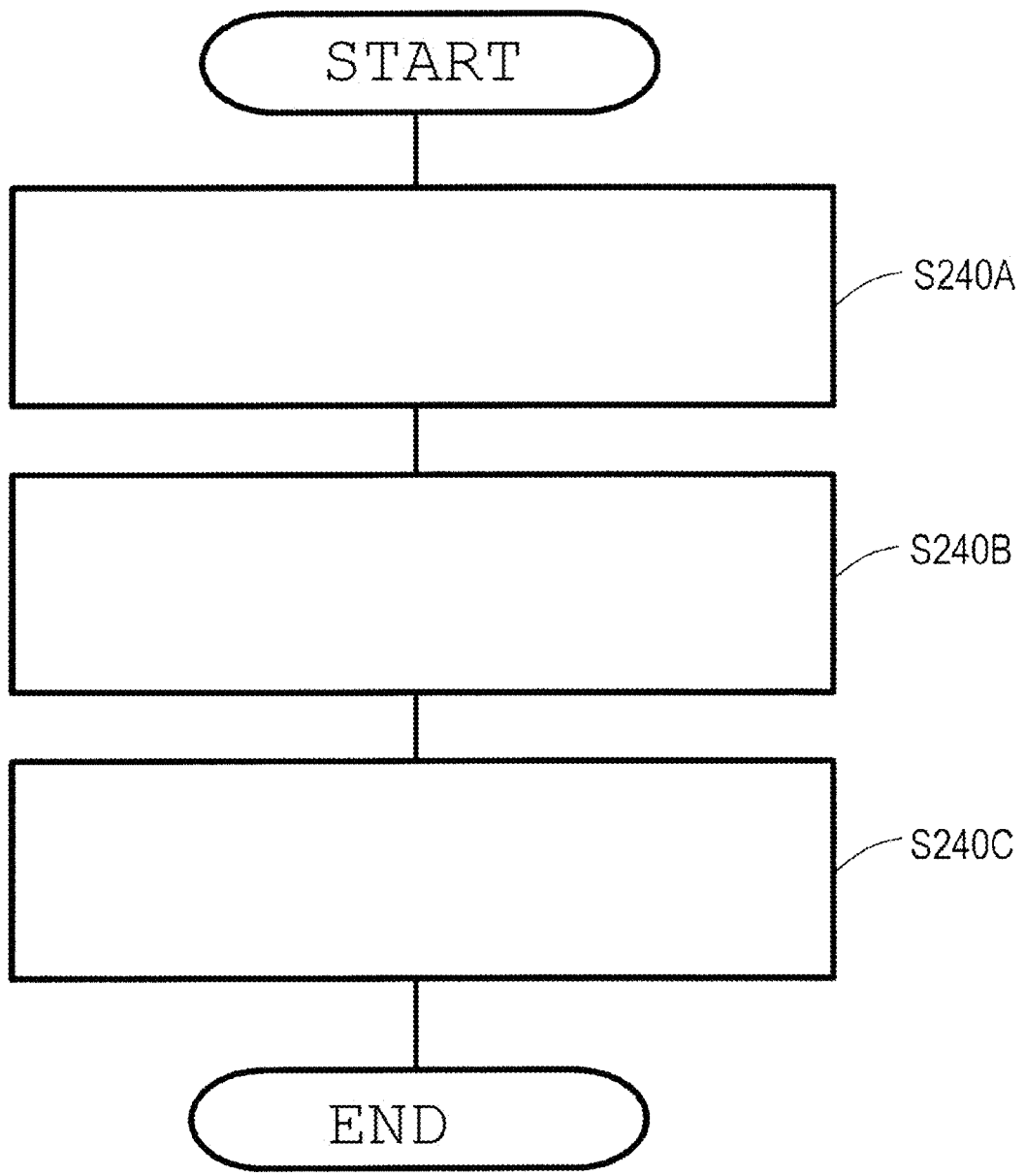
FIG. 12B is a flowchart showing another specific example of the process of step S200 for reading the identification resistance value.

FIGS. 11A to 11C show circuit configurations of variations of the identification resistance unit 250. FIG. 12A is a more detailed flowchart of step S200 for reading the identification resistance value in the processing flow of the identification method to identify the type of the brushless DC motor 200 including the identification resistance unit 250 shown in FIG. 11A or 11B. FIG. 12B shows a more detailed flowchart of step S200 for reading the identification resistance value in the processing flow of the identification method to identify the type of the brushless DC motor 200 including the identification resistance unit 250 shown in FIG. 11C.

As shown in FIG. 11A, in one example embodiment, the identification resistance unit 250 has resistors 251A, 251B, and 251C that are connected in parallel with each other. A switch 252A is connected in series to the resistor 251A, a switch 252B is connected in series to the resistor 251B, and a switch 252C is connected in series to the resistor 251C.

As shown in FIG. 12A, in step S200, generation of a PWM signal is stopped using the timer function of the MCU 221 of the motor drive IC 220 from the start of application of the identification power supply voltage until a predetermined time (for example, 0.1 s) elapses (step S230A).

In a state where driving of the inverter 230 is stopped, the switches 252A, 252B and 252C connected to the resistors 251A, 251B, and 251C are sequentially turned on (step S230B). The resistor 251A has a resistance value r1, the resistor 251B has a resistance value r2, and the resistor 251C has a resistance value r3. For example, the resistance value r1 is 20 kΩ, the resistance value r2 is 30 kΩ, and the resistance value r3 is 40 kΩ.

The resistance values r1, r2, and r3 are sequentially acquired as identification resistance values by the resistance value detector 152 of the identifier 100 (step S230C). The resistance value detector 152 can identify the type of the brushless DC motor based on a combination of the three resistance values r1, r2, and r3. Thus, the number of identifiable types can be increased by increasing the number of identification resistors.

As shown in FIG. 11B, in one example embodiment, the identification resistance unit 250 includes a plurality of resistors 251A, 251B, and 251C connected to each other in series. A switch 252A is connected in series to the resistor 251A, and a switch 252B is connected in series to the resistor 251B. One ends of the switch 252A and the switch 252B are connected to each other.

For example, in a state where the switches 252A, 252B and 252C are all turned off, a combined resistance (r1+r2+r3) of the resistance values r1, r2 and r3 is read by the resistance value detector 152. Next, in a state where the switch 252B is turned on and the switch 252A is turned off, a combined resistance (r1+r2) of the resistance values r1 and r2 is read by the resistance value detector 152. Finally, in a state where the switch 252A is turned on and 252B is turned off, the resistance value r1 is read by the resistance value detector 152. The type of the brushless DC motor 200 can be identified based on the combination of the read three resistance values.

As shown in FIG. 11C, in one example embodiment, the identification resistance unit 250 has a variable resistance 253. For example, the motor drive IC 220 can perform control to switch the resistance value of the variable resistance 253. As shown in FIG. 12B, while driving of the inverter 230 is stopped, the resistance value of the variable resistance is sequentially switched by the motor drive IC 220, and a plurality of resistance values (resistance value group of variable resistance) set according to switching of the resistance value of the variable resistance are set to the brushless DC motor 200 (steps S240A and S240B). By sequentially reading out the plurality of resistance values by the resistance value detector 152, it is possible to identify the type of the brushless DC motor 200 based on the combination of the resistance values (step S240C).

A brushless DC motor 200 according to the present example embodiment is different from the brushless DC motor 200 according to the first example embodiment in that a switching circuit 270 is provided as means for stopping the inverter 230. Hereinafter, differences from the first example embodiment will be mainly described.

Figure 13:
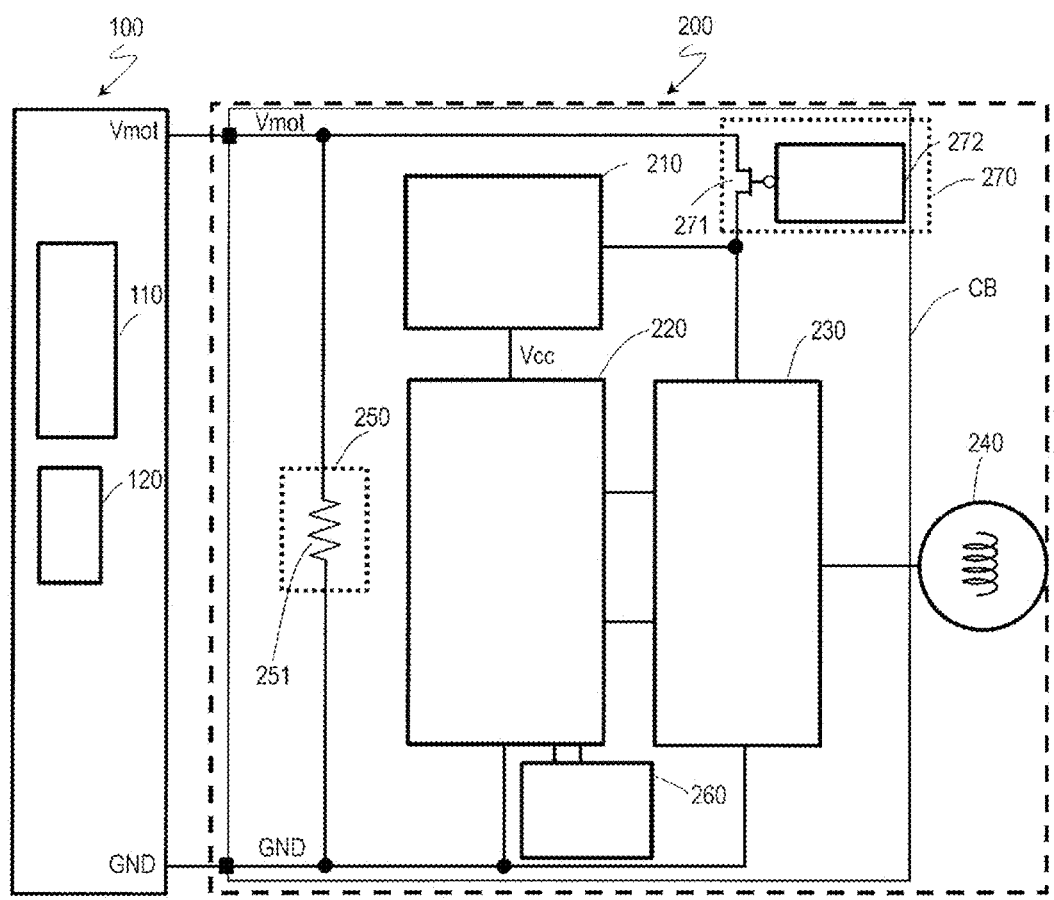
FIG. 13 is a block diagram schematically showing examples of typical block configurations of a user system 100 and a brushless DC motor 200 according to a second example embodiment of the present disclosure.

FIG. 13 schematically shows examples of typical block configurations of the user system 100 and the brushless DC motor 200 according to the present example embodiment.

The brushless DC motor 200 further includes the switching circuit 270 having a switch 271 and an under voltage lockout circuit (UVLO) 272. The switching circuit 270 switches connection and disconnection between the power supply line and the regulator 210 or the inverter 230.

As the switch 271, for example, a semiconductor switch such as a unipolar transistor (MOSFET, JFET) or a bipolar transistor can be used. As the switch 271, for example, an optocoupler, a thyristor, a mechanical relay, or the like may be used.

Figure 14:
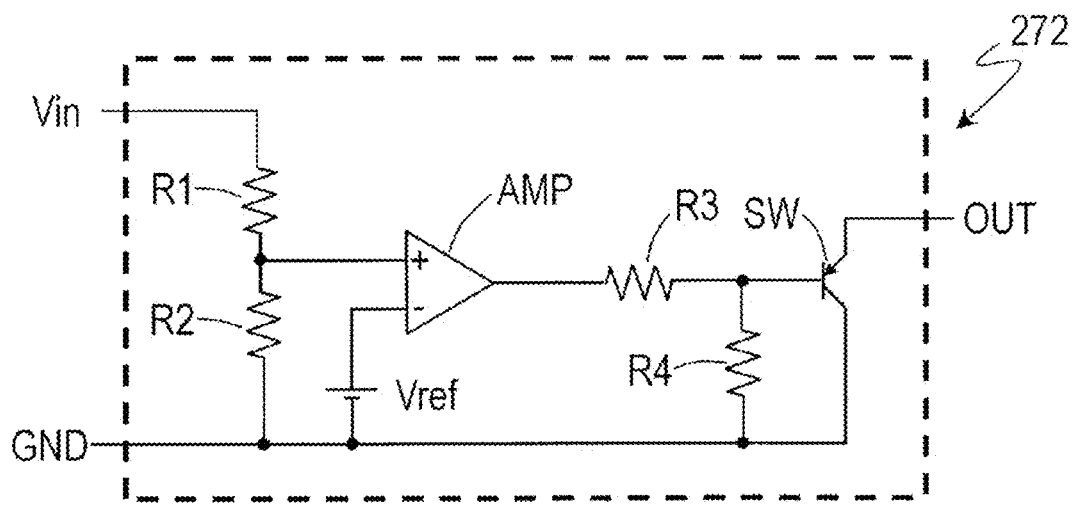
FIG. 14 is a circuit diagram showing an exemplary circuit configuration of an under voltage lockout circuit 272.

FIG. 14 shows an exemplary circuit configuration of the under voltage lockout circuit 272.

The under voltage lockout circuit 272 has, for example, a plurality of resistors R1, R2, R3, and R4, a comparator AMP, and a switch SW. The under voltage lockout circuit 272 is connected to a power supply line. The under voltage lockout circuit 272 disconnects the inverter 230 from the power supply line when the level of the input voltage Vin supplied via the power supply line is equal to or lower than a threshold. As a result, no input voltage is supplied to the inverter 230. The threshold is set lower than the lower limit value of the range of the operating power supply voltage (for example, 7 to 13.8 V) used for normal motor driving. The threshold can be set to, for example, about 5.0 V.

The under voltage lockout circuit 272 compares the input voltage with the reference voltage Vref. The reference voltage Vref corresponds to the threshold described above. For example, when a P-type semiconductor switch is used as the switch 271, if the input voltage is equal to or lower than the reference voltage Vref, the under voltage lockout circuit 272 outputs a high-level voltage to turn off the switch. On the other hand, when the input voltage is higher than the reference voltage Vref, the under voltage lockout circuit 272 outputs a low-level voltage to turn on the switch 271.

Note that, in this example, a P-type semiconductor switch is illustrated as the switch 271. However, an N-type semiconductor switch, a PNP transistor, an NPN transistor, or the like may be used depending on the circuit configuration.

Figure 15:
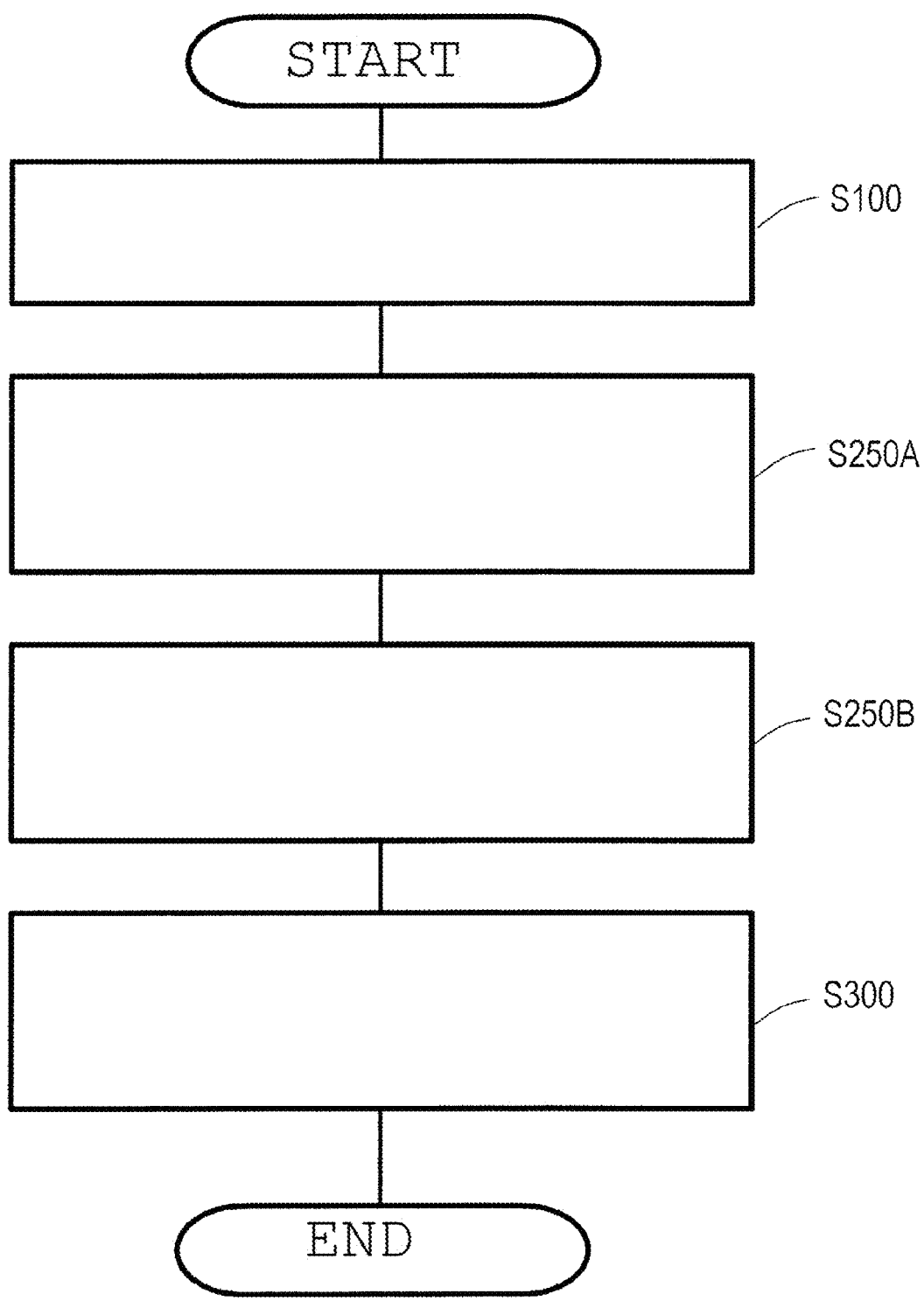
FIG. 15 is a flowchart of an identification method to identify the type of the brushless DC motor 200 according to the second example embodiment of the present disclosure.

FIG. 15 shows a flowchart of an identification method to identify the type of the brushless DC motor 200 according to the present example embodiment.

In supplying the identification power supply voltage, a level equal to or lower than the above-described threshold, that is, a low-level input voltage different from that in the normal driving, is supplied via the power supply line. The identification power supply voltage is supplied from, for example, the resistance value detector 152 (see FIG. 3) of the identifier 100. However, as described above, this may be supplied from the DC power supply 151 (see FIG. 3).

By supplying a low-level identification power supply voltage, the switching circuit 270 disconnects the inverter 230 from the power supply line. As a result, the power supply to the inverter 230 is cut off, and the inverter 230 is stopped. Since the regulator 210 is also disconnected from the power supply line by the switching circuit 270, the power supply voltage Vcc of the motor drive IC is not generated. Therefore, motor drive IC 220 also stops.

In a state where the inverter 230 is stopped, an identification current including information indicating the identification resistance value of the identification resistor 251 flows through the power supply terminal of the brushless DC motor 200. As in step S210B described in the first example embodiment, in a state where the inverter 230 is stopped, the identification resistance value is read as unique information of the brushless DC motor 200 using the identifier 100. When a low-level identification power supply voltage is applied to the brushless DC motor 200, no motor current flows through the inverter 230, but an identification current flows through the identification resistor 251 according to the identification resistance value.

The type of the brushless DC motor 200 is identified by the discriminator 153 based on the detected identification resistance value with reference to, for example, the table illustrated in FIG. 6 (step S300).

According to the identification method of the present example embodiment, unlike the conventional hand handshake, the type of the brushless DC motor 200 can be identified by reading the identification resistance value while the motor drive IC 220 (mainly the MCU 221) is not activated and the inverter 230 is stopped.

Figure 16:
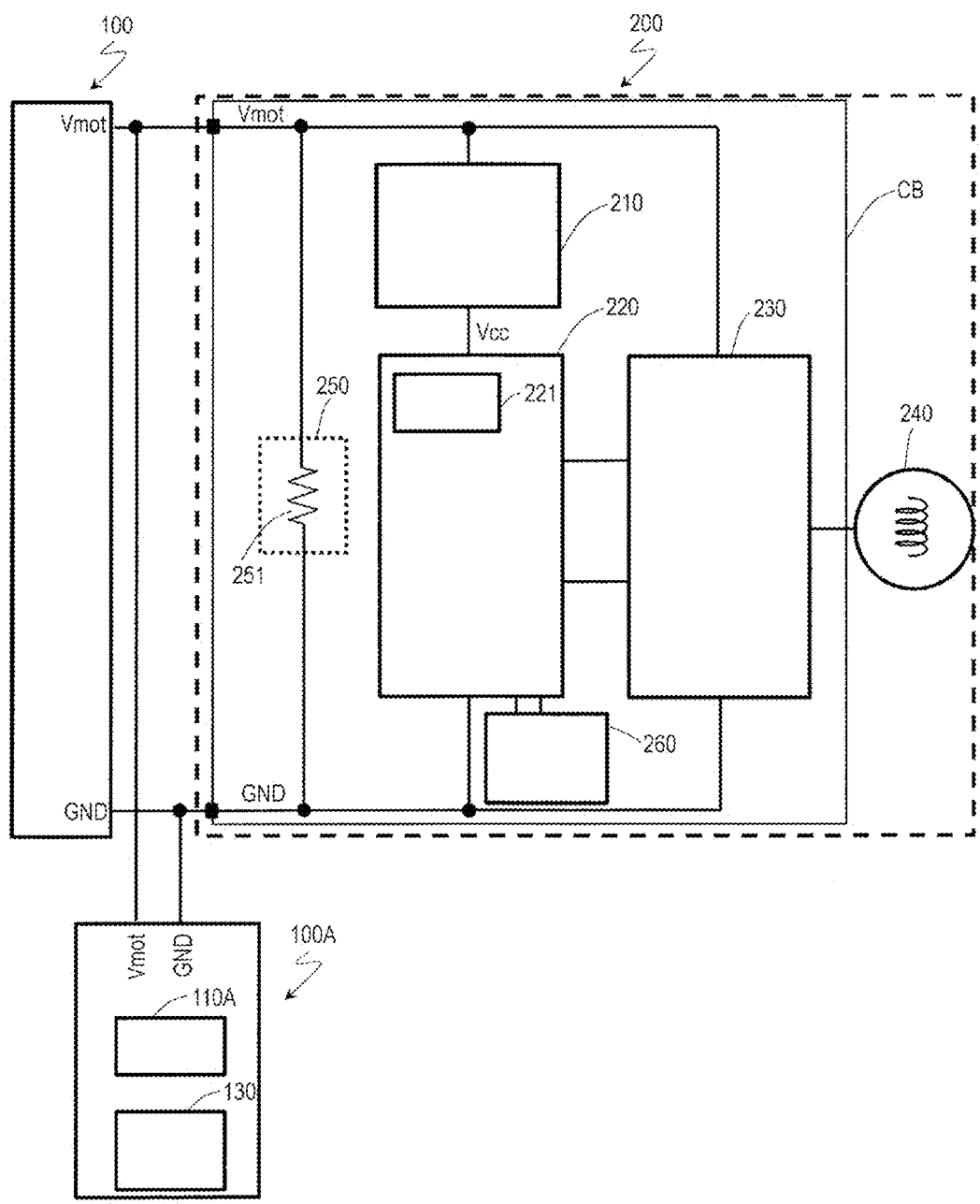
FIG. 16 is a block diagram schematically showing examples of typical block configurations of a user system 100, an identifier 100A, and a brushless DC motor 200 according to a third example embodiment of the present disclosure.

FIG. 16 schematically shows examples of typical block configurations of the user system 100, an identifier 100A, and the brushless DC motor 200.

The identifier 100A according to the present example embodiment is a device different from the user system 100, unlike the first or second example embodiment. The identifier 100A includes, for example, an MCU 110A equipped with a DC power supply 151, a resistance value detector 152, and a discriminator 153, and a light emitting element 130. Note that, for simplicity, FIG. 16 does not show the DC power supply 151, the resistance value detector 152, and the discriminator 153. The identifier 100A includes a Vmot terminal and a GND terminal as terminals necessary to identify the type of the brushless DC motor 200.

The user system 100, the identifier 100A, and the brushless DC motor 200 are electrically connected to each other between the Vmot terminal and the GND terminal. The identification power supply voltage can be supplied from the identifier 100A to the brushless DC motor 200 via the Vmot terminal.

When the power supply is turned on, an identification current including information on the identification resistance value flows through the power supply line. The identifier 100A can identify the type of the brushless DC motor 200, for example, according to the processing flow shown in FIG. 5 or FIG. 15. The MCU 110A may transmit the identification result to the controller 110 of the user system 100.

Figure 17:
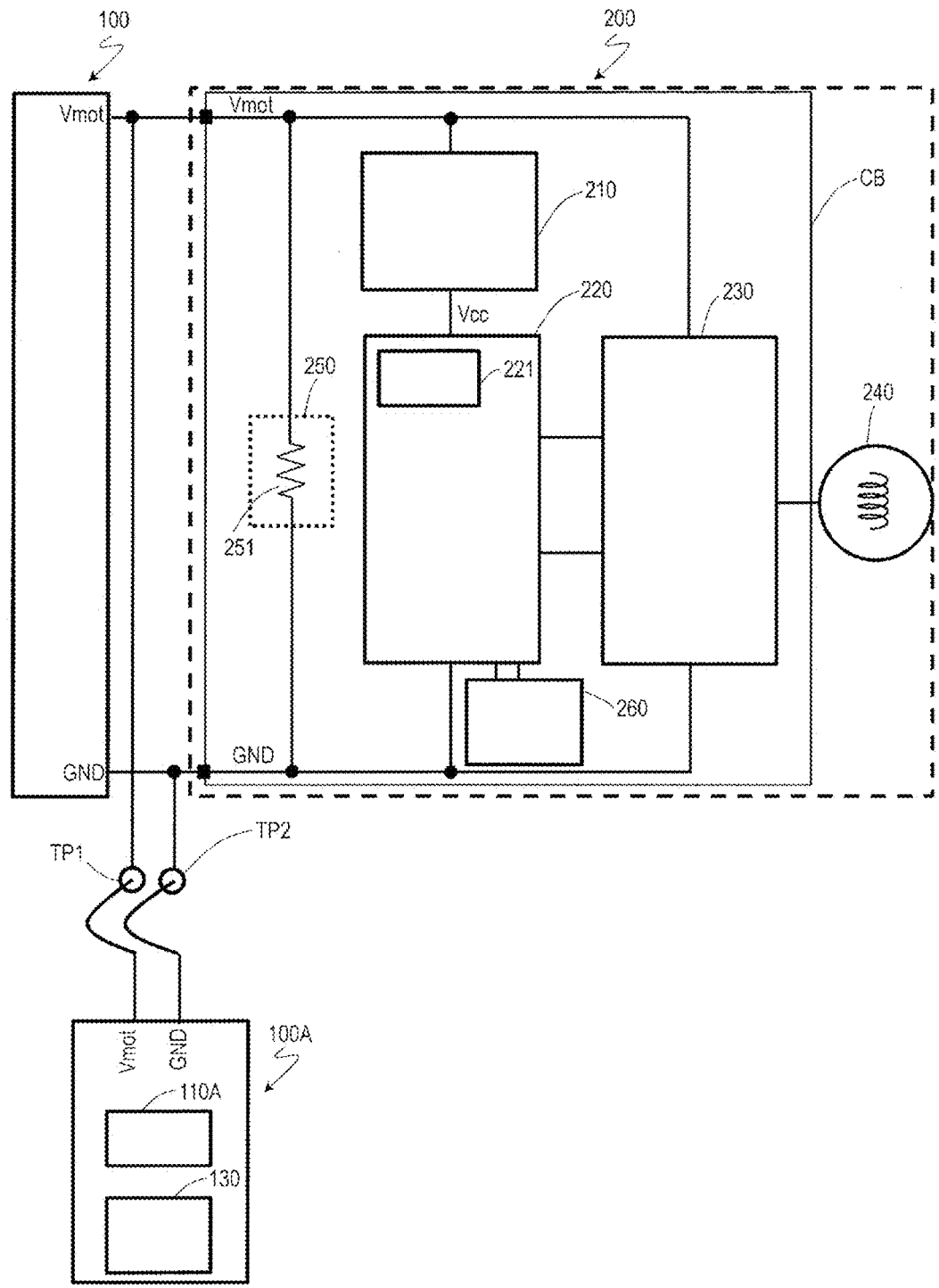
FIG. 17 is a block diagram schematically showing another example of a block configuration of the user system 100, the identifier 100A, and the brushless DC motor 200 according to the third example embodiment of the present disclosure.

FIG. 17 schematically shows other exemplary block configurations of the user system 100, the identifier 100A, and the brushless DC motor 200.

The identifier 100A is electrically connected to the user system 100 and the brushless DC motor 200, for example, via a test point (TP). TP1 is a TP for identification power supply. TP2 is a TP for GND. A dedicated probe is connected to the identifier 100A, and the probe can be applied to the TP to identify the type of the brushless DC motor 200.

The outline of one aspect of the present disclosure is as described below.

An identification method according to an exemplary example embodiment of the present disclosure is an identification method used for an identifier that identifies information on a brushless DC motor output from the brushless DC motor. The brushless DC motor 200 has at least one resistor 251 connected between a power supply line and a GND line, for example, as shown in FIG. 2. As described with reference to FIG. 1, the identification method includes supplying the identification power supply voltage from the identifier 100 to the brushless DC motor 200 via the power supply line, and in a state where the inverter 230 of the brushless DC motor 200 is off, reading the identification resistance value of at least one resistor 251, and identifying information on the brushless DC motor 200 based on the read identification resistance value. The information on the brushless DC motor 200 includes, for example, identification information of the brushless DC motor 200, serial number of the brushless DC motor 200, lot number, input power, input current, input voltage, motor temperature, rated current or rated voltage, and the like.

According to such an identification method, the identification resistance value can be read while the inverter 230 of the brushless DC motor 200 is stopped. This provides a brushless DC motor identification method capable of identifying information on the brushless DC motor without performing a handshake.

In one example embodiment, in reading the identification resistance value, the identification resistance value is read in a state where driving of the inverter 230 is stopped until a predetermined time elapses from the start of application of the identification power supply voltage, that is, 0.1 s, for example.

According to such an identification method, it is possible to read the identification resistance value in a state where driving of the inverter 230 is reliably stopped.

In one example embodiment, driving of the inverter 230 is stopped using a timer function mounted on the brushless DC motor 200.

According to such an identification method, driving of the inverter 230 can be reliably stopped using a general-purpose timer function built in the MPU.

In one example embodiment, information on the brushless DC motor 200 indicates the type of the brushless DC motor. For example, as described with reference to FIG. 5, a unique resistance that is different for each type of the plurality of brushless DC motors is assigned to at least one resistor 251, and in reading the identification resistance value, by the resistance value detector 152 shown in FIG. 3, the value of the unique resistance is read as unique information of the brushless DC motor 200, and in identifying the information on the brushless DC motor 200, the type of the brushless DC motor 200 is identified based on the read value of the unique resistance.

According to such an identification method, it is possible to identify the type of the brushless DC motor 200 without performing a handshake.

In one example embodiment, in identifying the type of the brushless DC motor 200, with reference to a look-up table that associates a plurality of types of brushless DC motors and pieces of unique information of the plurality of brushless DC motors, the type of the brushless DC motor 200 is identified based on the value of the read unique resistance. The look-up table is exemplified in FIG. 6, for example.

According to such an identification method, it is possible to associate the types of the plurality of brushless DC motors with pieces of unique information of the plurality of brushless DC motors using the lookup table.

In one example embodiment, as described with reference to FIG. 8, the brushless DC motor 200 further includes the switch 252 connected between one end of at least one resistor 251 and a power supply line or between the other end of at least one resistor 251 and a GND line. As described with reference to FIG. 9, the identification method further includes turning on/off the switch 252 in a state where driving of the inverter 230 is stopped. In reading the resistance value of at least one resistor 251, a plurality of resistance values (for example, an ASCII code character string) including a resistance value (for example, high level "1") set according to the on state of the switch 252 and a high impedance value (for example, low level "0") set according to the off state are acquired, and in identifying the information on the brushless DC motor 200, the information on the brushless DC motor 200 is identified based on the plurality of resistance values.

According to such an identification method, character string information including various codewords such as an ASCII code or a binary code can be transmitted to the identifier 100.

In one example embodiment, as shown in FIG. 11A or 11B, at least one resistor 251 has a plurality of resistors connected in series or parallel to each other. The brushless DC motor 200 further includes at least one switch 252A, 252B, or 252C connected to the plurality of resistors. As shown in FIG. 12A, in the identification method, in a state where driving of the inverter 230 is stopped, at least one switch is turned on, and in reading the resistance value of at least one resistor, a resistance value group including at least one of a resistance value of each of the plurality of resistor and a combined resistance value that can be set by each resistance value is obtained, and in identifying the information on the brushless DC motor 200, the information on the brushless DC motor 200 is identified based on the resistance value group.

According to such an identification method, the number of identifiable types can be increased by increasing the number of identification resistors.

In one example embodiment, as shown in FIG. 11A, at least one resistor 251 is a plurality of resistors 251A, 251B, and 251C connected in parallel with each other. Switches 252A, 252B, and 252C are connected in series to the plurality of resistors, respectively. As shown in FIG.12A, the identification method further includes, in a state where driving of the inverter 230 is stopped, sequentially turning on the plurality of switches 252A, 252B, and 252C connected to the plurality of resistors 251A, 251B, and 251C. In reading the resistance value group, a plurality of resistance values r1, r2, and r3 of the plurality of resistors 251A, 251B, and 251C are obtained, and in identifying the information on the brushless DC motor 200, the information on the brushless DC motor 200 is identified based on the plurality of resistance values r1, r2, and r3.

According to such an identification method, a variation using a plurality of identification resistors is provided, and the number of identifiable types can be increased by increasing the number of identification resistors.

In one example embodiment, as shown in FIG. 11C, at least one resistor 251 is a variable resistance 253. In the identification method, as shown in FIG. 12B, the resistance value of the variable resistance 253 is sequentially switched in a state where driving of the inverter 230 is stopped. In reading the resistance value of at least one resistor, a plurality of resistance values set by switching the resistance value of the variable resistance 253 are obtained, and in identifying the information on the brushless DC motor 200, the information on the brushless DC motor 200 is identified based on the plurality of resistance values.

According to such an identification method, the number of identifiable types can be increased by using the variable resistance 253.

In one example embodiment, the identification method further includes notifying the result of identifying the type of the brushless DC motor 200 using the identifier 100.

According to such an identification method, for example, as described above, the controller 110 of the identifier 100 may temporarily write the identification result to the memory 120, or transmit the identification result to another apparatus or device that needs the identification result. Further, it is possible to notify the result of identifying the type of the brushless DC motor 200 using a display device (for example, a liquid crystal display) or a speaker.

In one example embodiment, the identification method further includes allowing, from among a plurality of light emitting elements 130 each assigned to each of a plurality of types of brushless DC motors, that is, a plurality of LEDs for example, a light emitting element assigned to the brushless DC motor 200 to be identified to emit light based on the result of identifying the type of the brushless DC motor.

According to such an identification method, for example, a red LED can be assigned to a supplier A, a blue LED can be assigned to a supplier B, and a green LED can be assigned to a supplier C. When the controller 110 of the identifier 100 identifies the brushless DC motor of the supplier C, the green LED is allowed to emit light.

In one example embodiment, the brushless DC motor 200 is a DC fan having an impeller, for example.

According to such an identification method, for example, the type of the brushless DC motor 200 such as an axial fan, a centrifugal fan, a cross flow fan, or a sirocco fan can be identified.

The identifier 100 according to an example embodiment of the present disclosure is an identifier that identifies information on a brushless DC motor. As described with reference to FIG. 2 for example, the brushless DC motor 200 includes the inverter 230 that drives the motor, and at least one resistor 251 connected between a power supply line and a GND line. The identifier 100 includes the power supply terminal Vmot to supply an identification power supply voltage to the brushless DC motor 200 via a power supply line, and the controller 110 to identify information on the brushless DC motor 200. As described with reference to FIG. 3, the controller 110 supplies the identification power supply voltage to the brushless DC motor 200, and in a state where the inverter 230 of the brushless DC motor 200 is off, reads the identification resistance value of at least one resistor 251, and identifies the information on the brushless DC motor 200 based on the read identification resistance value.

According to such an identifier, the identification resistance value can be read in a state where the inverter 230 of the brushless DC motor 200 is stopped. Thus, an identifier for the brushless DC motor 200 capable of identifying information on the brushless DC motor, without performing a handshake, is provided.

As described with reference to FIG. 2 for example, the brushless DC motor 200 according to an example embodiment of the present disclosure includes the circuit board CB, the power supply terminal Vmot to supply an input voltage from the outside, the power supply terminal Vmot being disposed on the circuit board CB, the inverter 230 that drives the motor, and at least one resistor 251 connected between a power supply line connected to the power supply terminal Vmot and a GND line, the at least one resistor having a resistance value larger than the DC resistance of the motor. In a state where the identification power supply voltage is supplied via the power supply terminal Vmot and the inverter 230 is off, a current including information indicating the identification resistance value of at least one resistor 251 flows through the power supply terminal Vmot.

According to such a brushless DC motor, the brushless DC motor 200 capable of transmitting the identification resistance value to the identifier 100, in a state where the inverter 230 of the brushless DC motor 200 is stopped, is provided.

In one example embodiment, at least one resistor 251 has a resistance value that is at least 10 times or more the DC resistance of the motor.

According to such a brushless DC motor, it is possible to suppress power loss due to at least one resistor 251 during normal motor driving.

In one example embodiment, as described is FIG. 3, the brushless DC motor 200 further includes the switch 252 connected between one end of at least one resistor 251 and a power supply line or between the other end of at least one resistor 25 and a GND line.

According to such a brushless DC motor, character string information including various codewords such as an ASCII code or a binary code can be transmitted to the identifier 100.

In one example embodiment, as described with reference to FIG. 11A or FIG. 11B, in the brushless DC motor 200, at least one resistor is a plurality of resistors 251A, 251B, and 251C connected in series or parallel to each other, and the brushless DC motor 200 further includes a plurality of switches 252A, 252B, and 252C connected to the plurality of resistors 251A, 251B, and 252C.

According to such a brushless DC motor, the number of identifiable types can be increased by increasing the number of identification resistors.

In one example embodiment, as described with reference to FIG. 11A, the plurality of resistors 251A, 251B, and 252C are connected in parallel with each other, and a plurality of switches 252A, 252B, and 252C connected to the plurality of resistors 251A, 251B, and 252C are further included.

According to such a brushless DC motor, the number of identifiable types can be increased by increasing the number of identification resistors.

In one example embodiment, at least one resistor is a variable resistance 253.

According to such a brushless DC motor, the number of identifiable types can be increased by using the variable resistance 253.

Example embodiments of the present disclosure are widely used in various devices including various fan motors, such as a personal computer, a game machine, a vacuum cleaner, a dryer, a washing machine, and a refrigerator.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

Th invention claimed is:

1. An identification method to identify information on a brushless DC motor output from the brushless DC motor, the identification method being used with an identifier, the brushless DC motor including at least one resistor connected between a power supply line and a GND line, the method comprising:
supplying an input voltage from the identifier to the brushless DC motor via the power supply line;
reading a resistance value of the at least one resistor in a state where an inverter of the brushless DC motor is off; and
identifying information on the brushless DC motor based on the read resistance value of the at least one resistor.

2. The identification method according to claim 1, wherein the reading the resistance value of the at least one resistor includes reading the resistance value in a state where driving of the inverter is stopped from start of application of the input voltage until a predetermined time elapses.

3. The identification method according to claim 2, wherein the driving of the inverter is stopped using a timer function included in the brushless DC motor.

4. The identification method according to claim 2, wherein
the information on the brushless DC motor indicates a type of the brushless DC motor;
a unique resistance is assigned to the at least one resistor, the unique resistance being different for each type of a plurality of brushless DC motors;
the reading the resistance value includes reading a value of the unique resistance by a resistance value detector as unique information of the brushless DC motor; and
the identifying the information on the brushless DC motor includes identifying the type of the brushless DC motor based on the read value of the unique resistance.

5. The identification method according to claim 4, wherein the identifying the type of the brushless DC motor includes referring to a table in which types of the plurality of brushless DC motors and pieces of the unique information of the plurality of brushless DC motors are associated with each other, and identifying the type of the brushless DC motor based on the read value of the unique resistance.

6. The identification method according to claim 4, further comprising from among a plurality of light emitting elements assigned to respective types of the plurality of brushless DC motors, allowing a light emitting element assigned to a brushless DC motor to be identified to emit light based on the result of identifying the type of the brushless DC motor.

7. The identification method according to claim 2, wherein
the brushless DC motor further includes a switch connected between one end of the at least one resistor and the power supply line or between another end of the at least one resistor and the GND line; and the method further comprises:
  turning on and off the switch in a state where the driving of the inverter is stopped;
  in the reading the resistance value of the at least one resistor, acquiring a plurality of resistance values including a resistance value set according to an on state of the switch and a high impedance value set according to an off state of the switch; and
  in the identifying the information on the brushless DC motor, identifying the information on the brushless DC motor based on the plurality of resistance values.

8. The identification method according to claim 2, wherein
  the at least one resistor is a plurality of resistors connected in series or in parallel with each other;
  the brushless DC motor further includes at least one switch connected to the plurality of resistors; and
  the method further comprises:
    in a state where the driving of the inverter is stopped, turning on the at least one switch;
    in the reading the resistance value of the at least one resistor, acquiring a resistance value group including at least one of respective resistance values of the plurality of resistors and a combined resistance value that is settable by the respective resistance values; and
    in the identifying the information on the brushless DC motor, identifying the information on the brushless DC motor based on the resistance value group.

9. The identification method according to claim 8, wherein the at least one resistor is a plurality of resistors connected in parallel to each other, and the switch is connected in series to each of the plurality of resistors; and
  the method further comprises:
    in a state where the driving of the inverter is stopped, sequentially turning on a plurality of the switches connected to the plurality of resistors;
    in reading the resistance value group, acquiring a plurality of resistance values of the plurality of resistors; and
    in the identifying the information on the brushless DC motor, identifying the information on the brushless DC motor based on the plurality of resistance values.

10. The identification method according to claim 2, wherein
  the at least one resistor has a variable resistance; and
  the method further comprises:
    in a state where the driving of the inverter is stopped, sequentially switching a resistance value of the variable resistance;
    in the reading the resistance value of the at least one resistor, acquiring a plurality of resistance values set by switching the resistance value of the variable resistance; and
    in the identifying the information on the brushless DC motor, identifying the information on the brushless DC motor based on the plurality of resistance values.

11. The identification method according to claim 1, the method further comprising notifying a result of identifying the information on the brushless DC motor using the identifier.

12. The identification method according to claim 1, wherein the brushless DC motor is a fan motor including an impeller.

13. An identifier that identifies information on a brushless DC motor including an inverter that drives a motor and at least one resistor connected between a power supply line and a GND line, the identifier comprising:
  a power supply terminal to supply an input voltage to the brushless DC motor via the power supply line; and
  a controller that identifies information on the brushless DC motor; wherein the controller:
    supplies the input voltage to the brushless DC motor, and reads a resistance value of the at least one resistor in a state where the inverter of the brushless DC motor is off; and
    identifies the information on the brushless DC motor based on the read resistance value of the at least one resistor.

14. A brushless DC motor comprising:
  a circuit board;
  a power supply terminal to supply an input voltage from outside, the power supply terminal being provided on the circuit board;
  an inverter that drives a motor; and
  at least one resistor connected between a power supply line connected to the power supply terminal and a GND line, the at least one resistor having a resistance value larger than a DC resistance of the motor; wherein
  in a state where the input voltage is supplied via the power supply terminal and the inverter is off, a current including information indicating the resistance value of the at least one resistor flows through the power supply terminal.

15. The brushless DC motor according to claim 14, wherein the at least one resistor has a resistance value that is at least 10 times or more greater that the DC resistance of the motor.

16. The brushless DC motor according to claim 14, further comprising a switch connected between one end of the at least one resistor and the power supply line or between another end of the at least one resistor and the GND line.

17. The brushless DC motor according to claim 14, wherein
  the at least one resistor includes a plurality of resistors connected in series or in parallel with each other; and
  the brushless DC motor further includes at least one switch connected to the plurality of resistors.

18. The brushless DC motor according to claim 17, wherein
  the plurality of resistors are connected in parallel with each other; and
  the brushless DC motor further includes a plurality of switches connected to the plurality of resistors.

19. The brushless DC motor according to claim 14, wherein the at least one resistor has a variable resistance.

* * * * *